United States Patent
Matsuoka

(10) Patent No.: US 8,422,778 B2
(45) Date of Patent: Apr. 16, 2013

(54) IMAGE COMPRESSING METHOD, IMAGE COMPRESSING APPARATUS, IMAGE FORMING APPARATUS, COMPUTER PROGRAM AND COMPUTER READABLE MEDIUM

(75) Inventor: Teruhiko Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 295 days.

(21) Appl. No.: 12/784,313

(22) Filed: May 20, 2010

(65) Prior Publication Data

US 2010/0296730 A1 Nov. 25, 2010

(30) Foreign Application Priority Data

May 21, 2009 (JP) ................................. 2009-123340

(51) Int. Cl.
*G06K 9/34* (2006.01)
*G06K 9/36* (2006.01)
*G06K 9/46* (2006.01)
*G06K 9/48* (2006.01)

(52) U.S. Cl.
USPC ............ 382/166; 382/176; 382/199; 382/244

(58) Field of Classification Search .................. None
See application file for complete search history.

(56) References Cited

U.S. PATENT DOCUMENTS

| | | | |
|---|---|---|---|
| 6,282,327 B1 * | 8/2001 | Betrisey et al. ............... | 382/299 |
| 6,360,023 B1 * | 3/2002 | Betrisey et al. ............... | 382/260 |
| 6,701,012 B1 * | 3/2004 | Matthews ..................... | 382/173 |
| 7,043,080 B1 * | 5/2006 | Dolan ........................... | 382/199 |
| 7,133,565 B2 * | 11/2006 | Toda et al. .................... | 382/243 |
| 7,158,669 B2 * | 1/2007 | Tanaka et al. ................. | 382/166 |
| 7,783,117 B2 * | 8/2010 | Liu et al. ....................... | 382/232 |
| 2002/0037100 A1 * | 3/2002 | Toda et al. .................... | 382/166 |
| 2006/0061794 A1 * | 3/2006 | Ito et al. ...................... | 358/1.13 |
| 2007/0160295 A1 * | 7/2007 | Wang et al. ................... | 382/199 |
| 2007/0189615 A1 * | 8/2007 | Liu et al. ...................... | 382/232 |
| 2007/0217701 A1 * | 9/2007 | Liu et al. ...................... | 382/234 |
| 2008/0175476 A1 * | 7/2008 | Ohk et al. ..................... | 382/176 |
| 2008/0273807 A1 * | 11/2008 | Dauw et al. .................. | 382/237 |
| 2009/0141048 A1 * | 6/2009 | Fujimoto et al. ............. | 345/673 |
| 2009/0208126 A1 * | 8/2009 | Matsumoto ................... | 382/244 |

FOREIGN PATENT DOCUMENTS

JP 2003-18413 A 1/2003

* cited by examiner

*Primary Examiner* — Wenpeng Chen
*Assistant Examiner* — Feng Niu
(74) *Attorney, Agent, or Firm* — Birch, Stewart, Kolasch & Birch, LLP

(57) ABSTRACT

During compressing an image at the compression processing section (image compressing apparatus), the color image processing apparatus detects edge of text and/or line art, generates the foreground layer represented by binary image for showing the detected edge, compresses the foreground layer with lossless compression, and compresses the background layer which is an image except the foreground layer with lossy compression. Furthermore, the color image processing apparatus sets the foreground layer color different from a color of text or line art, and provides information representing the set color into the compression file. As the set color, the color image processing apparatus utilizes the overall color representative for whole region of the image, or the text-vicinity color in the image. The edge region of the text and/or line art are represented with such the set color on the reproduced image based on the compression file.

9 Claims, 21 Drawing Sheets

TEXT  PHOTOGRAPH
  HALFTONE
    DOT

| 000 | 110 | 010 | 110 | 001 |
|-----|-----|-----|-----|-----|
| 000 | 110 | 010 | 110 | 001 |
| 100 | 010 | 010 | 110 | 001 |
| 100 | 010 | 110 | 010 | 001 |
| 000 | 010 | 010 | 010 | 000 |

| 0 | 1 | 0 | 1 | 0 |
|---|---|---|---|---|
| 0 | 1 | 0 | 1 | 0 |
| 1 | 0 | 0 | 1 | 0 |
| 1 | 0 | 1 | 0 | 0 |
| 0 | 0 | 0 | 0 | 0 |

FIG. 6A

| 255 | 255 | 255 | 255 | 255 | 255 | 60 | 10 | 60 | 255 | 255 |
|---|---|---|---|---|---|---|---|---|---|---|
| 255 | 255 | 255 | 255 | 255 | 255 | 60 | 10 | 60 | 255 | 255 |
| 255 | 255 | 255 | 255 | 255 | 255 | 40 | 10 | 60 | 255 | 255 |
| 255 | 255 | 255 | 255 | 255 | 60 | 10 | 40 | 255 | 255 | 255 |
| 255 | 255 | 255 | 255 | 255 | 60 | 10 | 60 | 255 | 255 | 255 |
| 255 | 255 | 255 | 255 | 255 | 60 | 10 | 60 | 255 | 255 | 255 |
| 255 | 255 | 255 | 255 | 255 | 40 | 10 | 60 | 255 | 255 | 255 |
| 255 | 255 | 255 | 255 | 60 | 10 | 40 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 40 | 10 | 60 | 255 | 255 | 255 | 255 |
| 255 | 255 | 255 | 60 | 10 | 40 | 255 | 255 | 255 | 255 | 255 |
| 255 | 255 | 255 | 60 | 10 | 60 | 255 | 255 | 255 | 255 | 255 |
| 255 | 255 | 255 | 60 | 10 | 60 | 255 | 255 | 255 | 255 | 255 |
| 255 | 255 | 255 | 40 | 10 | 60 | 255 | 255 | 255 | 255 | 255 |
| 255 | 255 | 60 | 10 | 40 | 255 | 255 | 255 | 255 | 255 | 255 |
| 255 | 255 | 40 | 10 | 60 | 255 | 255 | 255 | 255 | 255 | 255 |
| 255 | 60 | 10 | 40 | 255 | 255 | 255 | 255 | 255 | 255 | 255 |
| 255 | 60 | 10 | 60 | 255 | 255 | 255 | 255 | 255 | 255 | 255 |

FIG. 6B

| -1 | -1 | -1 |
|---|---|---|
| -1 | 8 | -1 |
| -1 | -1 | -1 |

FIG. 7A

| 0 | 0 | 0 | 0 | 255 | 0 | 0 | 0 | 255 |
|---|---|---|---|---|---|---|---|---|
| 0 | 0 | 0 | 195 | 255 | 0 | 0 | 0 | 255 |
| 0 | 0 | 0 | 255 | 0 | 0 | 0 | 255 | 195 |
| 0 | 0 | 0 | 255 | 0 | 0 | 0 | 255 | 0 |
| 0 | 0 | 0 | 255 | 0 | 0 | 0 | 255 | 0 |
| 0 | 0 | 195 | 255 | 0 | 0 | 0 | 255 | 0 |
| 0 | 0 | 255 | 0 | 0 | 0 | 255 | 195 | 0 |
| 0 | 0 | 255 | 0 | 0 | 0 | 255 | 0 | 0 |
| 0 | 0 | 255 | 0 | 0 | 0 | 255 | 0 | 0 |
| 0 | 0 | 255 | 0 | 0 | 0 | 255 | 0 | 0 |
| 0 | 195 | 255 | 0 | 0 | 0 | 255 | 0 | 0 |
| 0 | 255 | 0 | 0 | 0 | 255 | 195 | 0 | 0 |
| 0 | 255 | 0 | 0 | 0 | 255 | 0 | 0 | 0 |
| 0 | 255 | 0 | 0 | 0 | 255 | 0 | 0 | 0 |
| 195 | 255 | 0 | 0 | 0 | 255 | 0 | 0 | 0 |
| 255 | 0 | 0 | 0 | 255 | 195 | 0 | 0 | 0 |
| 255 | 0 | 0 | 0 | 255 | 0 | 0 | 0 | 0 |
| 0 | 0 | 0 | 255 | 195 | 0 | 0 | 0 | 0 |

FIG. 7B

| 0 | 0 | 0 | 0 | 1 | 0 | 0 | 0 | 1 |
|---|---|---|---|---|---|---|---|---|
| 0 | 0 | 0 | 1 | 1 | 0 | 0 | 0 | 1 |
| 0 | 0 | 0 | 1 | 0 | 0 | 0 | 1 | 1 |
| 0 | 0 | 0 | 1 | 0 | 0 | 0 | 1 | 0 |
| 0 | 0 | 0 | 1 | 0 | 0 | 0 | 1 | 0 |
| 0 | 0 | 1 | 1 | 0 | 0 | 0 | 1 | 0 |
| 0 | 0 | 1 | 0 | 0 | 0 | 1 | 1 | 0 |
| 0 | 0 | 1 | 0 | 0 | 0 | 1 | 0 | 0 |
| 0 | 0 | 1 | 0 | 0 | 0 | 1 | 0 | 0 |
| 0 | 0 | 1 | 0 | 0 | 0 | 1 | 0 | 0 |
| 0 | 1 | 1 | 0 | 0 | 0 | 1 | 0 | 0 |
| 0 | 1 | 0 | 0 | 0 | 1 | 1 | 0 | 0 |
| 0 | 1 | 0 | 0 | 0 | 1 | 0 | 0 | 0 |
| 0 | 1 | 0 | 0 | 0 | 1 | 0 | 0 | 0 |
| 1 | 1 | 0 | 0 | 0 | 1 | 0 | 0 | 0 |
| 1 | 0 | 0 | 0 | 1 | 1 | 0 | 0 | 0 |
| 1 | 0 | 0 | 0 | 1 | 0 | 0 | 0 | 0 |
| 0 | 0 | 0 | 1 | 1 | 0 | 0 | 0 | 0 |

BLOCK

REPRESENTATIVE
TEXT-VICINITY
VALUE

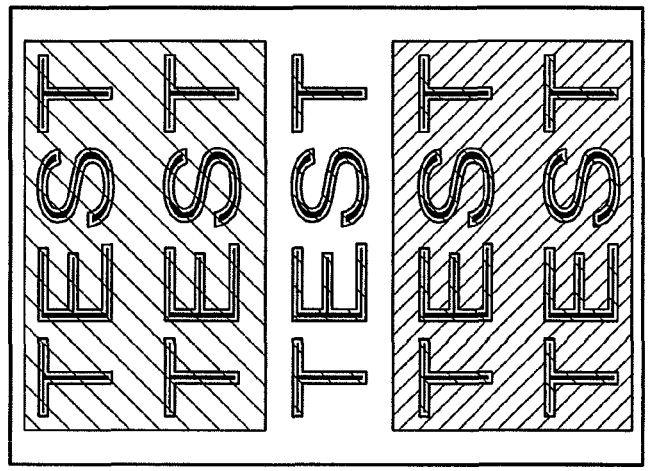
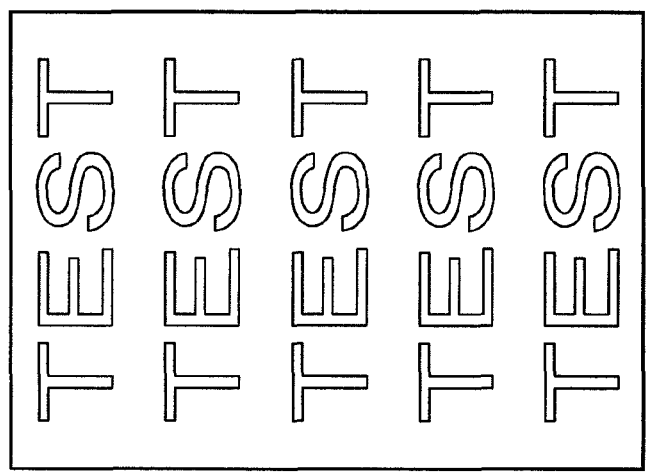
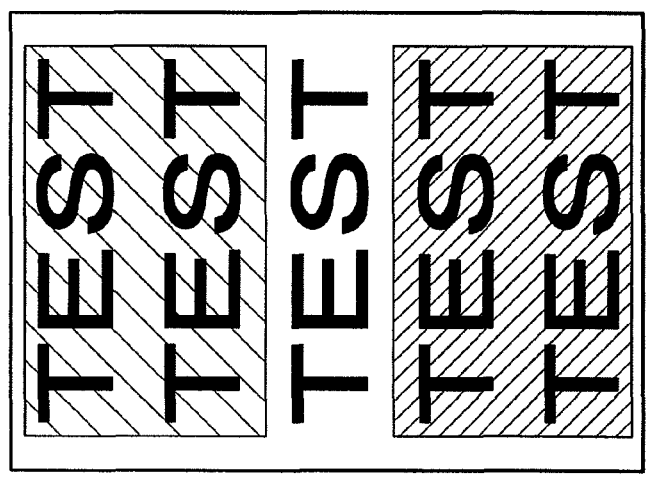

IMAGE COMPRESSING METHOD, IMAGE COMPRESSING APPARATUS, IMAGE FORMING APPARATUS, COMPUTER PROGRAM AND COMPUTER READABLE MEDIUM

CROSS-REFERENCE TO RELATED APPLICATIONS

This non-provisional application claims priority under 35 U.S.C. §119(a) on Patent Application No. 2009-123340 filed in Japan on May 21, 2009, the entire content of which is hereby incorporated by reference.

BACKGROUND OF THE INVENTION

1. Field of the Invention

The present invention relates to an image compressing method for compressing image data. Furthermore, the present invention relates to an image compressing method, an image compressing apparatus, an image forming apparatus, computer program and a computer readable medium for separating an image into a text layer and a background layer and compressing each layer with a corresponding proper method in order to obtain the compressed image data.

2. Description of Related Art

It is well known about image processing method that a text image on a paper or the like is read optically to generate electronic image data. Such the image processing method is utilized in many fields, for example, a scanner apparatus, a facsimile apparatus, a copy apparatus and a multi-function apparatus having these functions. The generated image data may be transmitted with utilizing facsimile communication or e-mail communication. In addition, the generated image data may be stored on database and utilized for several purposes. When an image is optically read out and then image data is generated on the basis of the read image, the generated image data generally has a large data size. Thus, it is required performing compression of the image data for achieving efficient data transmission and efficient data storage.

There are compression methods based on layer separation, such as Mixed Raster Content (MRC), for implementing high compression rate. In such the compression method based on layer separation, a foreground mask is generated from the image and the foreground mask represents a text and/or a line art. The image is separated into a foreground layer and a background layer based on the generated foreground mask, the foreground layer and the background layer are compressed with utilizing respective proper compression method, and then high-compressed image is obtained finally. The foreground layer represents a text consisting of characters and/or a line art illustrated in the image, and is generally compressed by a lossless compression method, such as Joint Bi-level Image Experts Group (JBIG), Modified Modified Read (MMR) or Lempel Ziv Welch (LZW).

On the other hand, the background layer represents image contents other than the text and/or the line art, and is generally compressed by a lossy compression method, such as Joint Photographic Experts Group (JPEG). In a method disclosed by Japanese Patent Application Laid-Open No. 2003-18413, a color text image contains a plurality of character regions, the color utilized in each character region is extracted, an inclusion image is generated that includes all the character regions illustrated with the same color, the inclusion image is compressed by the MMR, and the attached header is generated which contains the palette information of the inclusion image and the inclusion image information. In the case that an interest text region consisting of characters is illustrated with only one color, the interest text region is compressed by the MMR. In the case that an interest text region is illustrated with a plurality of colors, the interest text region is compressed by lossy compression. Then, the compression of the method results in the fact that the palette information and the text information are attached to the header. Japanese Patent Application Laid-Open No. 2003-18413 further discloses identifying text region of the color text image based on the text information, generating an image (corresponding to so-called background layer) whose identified text region is filled with a predetermined color, and compressing the generated image by the JPEG.

The lossy compression tends to degrade image quality greater than lossless compression. However, it is possible to control the lossy compression easier than the lossless compression. Thus, compression rate of the lossy compression may be increased in the case that preference is given to reduction in the data size and may be decreased in the case that preference is given to increase in the image quality. On the other hand, it is difficult to increase the compression rate of the lossless compression.

SUMMARY OF THE INVENTION

Generally, a whole region of a character is extracted on the basis of the shape of character in order to separate an image into the text layer and the background layer. The whole region extraction based on the shape may be implemented by detecting a space as the character region between the rising edge of the character and the falling edge of the character, or by detecting a space as the character region whose density or color is represented by a value more than a predetermined threshold value. However, it is difficult to correctly perform such the extraction based on only the shape, because such the extraction requires several pre-processing and post-processing for achieving enhanced results to exclude elements other than the shape of character, such as picture edges, printed dots or noises. It may not cause a problem in the method disclosed by the Japanese Patent Application Laid-Open No. 2003-18413 in the case that the character region is extracted correctly. However, in the case that the character region is not extracted correctly, it causes problems combining the text layer into the background layer, squeezing the character due to the lossy compression and degrading the visual recognition of the character, in the method disclosed by the Japanese Patent Application Laid-Open No. 2003-18413.

The present invention is made in view of such circumstances, and has an object to provide an image compressing method, an image compressing apparatus, an image forming apparatus, computer program, and a computer readable medium that extract the contour of a character, but not the whole region of the character based on the shape, to generate the foreground layer for achieving improved recognition of the character in the image after the compression processing.

BRIEF DESCRIPTION OF THE DRAWINGS

FIG. 6A and FIG. 6B are schematic views showing examples about binary image generated with a filter processing for detecting the text edge.

FIG. 7A and FIG. 7B are schematic views showing examples about binary image generated with a filter processing for detecting the text edge.

FIG. 18A, FIG. 18B and FIG. 18C are views showing results of image processing performed on the original image shown in FIG. 8C.

DESCRIPTION OF THE PREFERRED EMBODIMENTS

Hereinafter, embodiments of the present invention are described in detail with reference to drawings.

Embodiment 1

Figure 1:
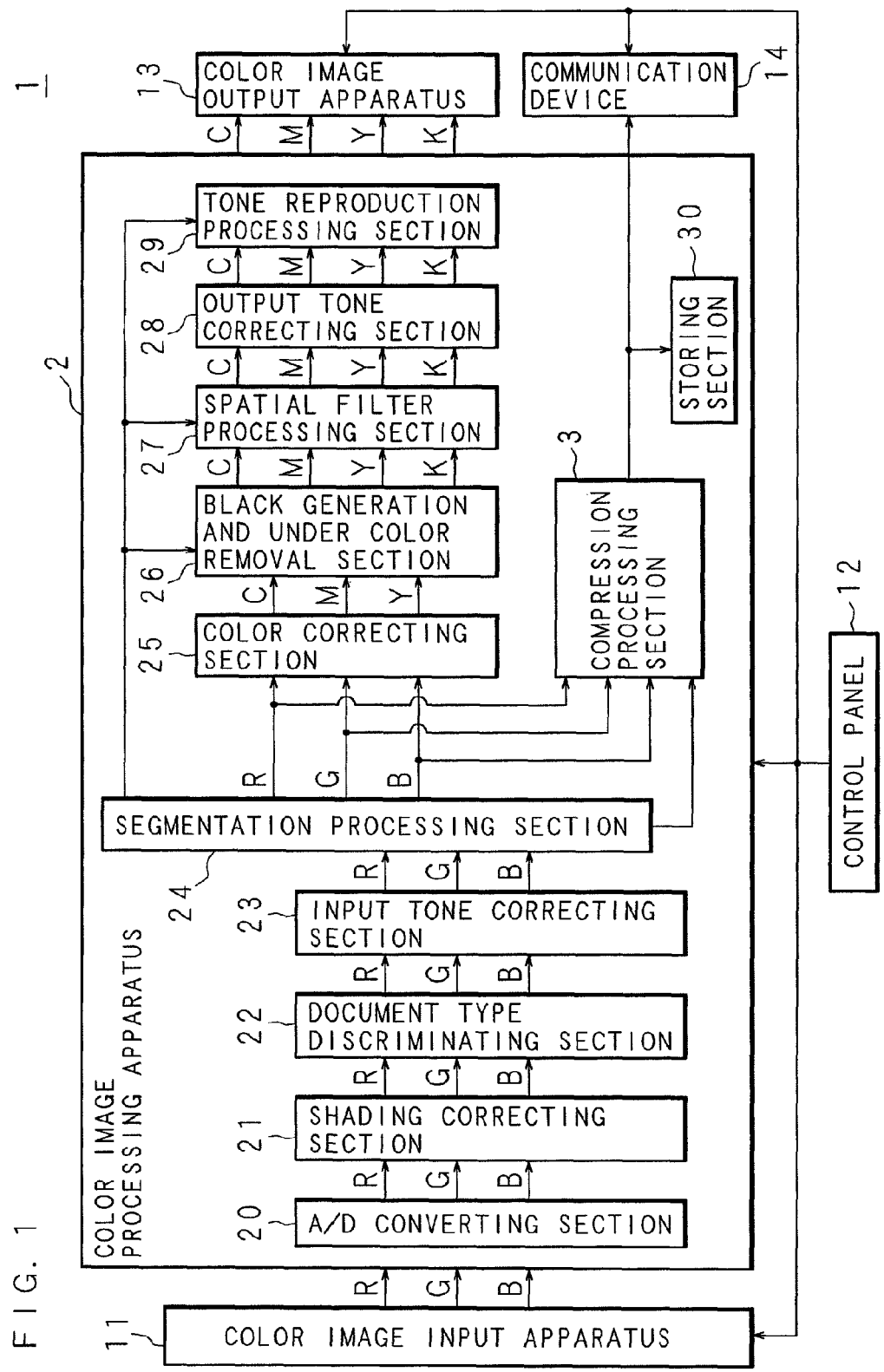
FIG. 1 is a block diagram showing functional components included by an image forming apparatus according to embodiment 1.

The embodiment 1 is illustrated in the context of the image compressing apparatus according to the present invention included in an image forming apparatus that forms a color image. FIG. 1 is a block diagram showing functional components included by the image forming apparatus according to the embodiment 1. The image forming apparatus 1 according to the present invention is a digital multi-function printer provided with color copy function, color scanner function and the like. The image forming apparatus 1 includes a color image input apparatus 11 that optically reads out a color image from a document. The color image input apparatus 11 is connected to a color image processing apparatus 2 that generates image data and compressed image data which are based on the color image read out by the color image input apparatus 11. The color image processing apparatus 2 is connected to a color image output apparatus 13 that outputs a color image which is based on the image data generated by the image processing apparatus 2. Furthermore, the color image processing apparatus 2 is connected to a communication device 14 that externally transmits the compressed data generated by the color image processing apparatus 2. A control panel 12 is connected to the color image input apparatus 11, the color processing apparatus 2, the color image output apparatus 13 and the communication device 14, in order to receive an instruction from a user.

The image forming apparatus 1 performs several processes that are controlled by a Central Processing Unit (CPU: not shown). The CPU of the image forming apparatus 1 can perform data communication through a network card (not shown) and a LAN cable (not shown) with a computer, another digital multi-function printer and the like that are connected into the communication network.

Next, it will be described about each component of the image forming apparatus 1. The control panel 12 is configured with a receiving section and a displaying section. The receiving section is a touch screen, numeric keypads or the like, and receives an instruction for setting an operating mode of the image forming apparatus 1, an instruction for controlling the operation of the image forming apparatus 1 and the like from a user. The displaying section is a liquid crystal display or the like and displays information required for a user to input an instruction.

The color image input apparatus 11 is a color scanner provided with an optical sensor, such as a Charge Coupled Device (CCD). The color image input apparatus 11 detects a reflected light from a document as analog RGB (R: Red; G: Green; B: Blue) signal, and outputs the signal to the color image processing apparatus 2.

The color image processing apparatus 2 includes an A/D converting section 20, a shading correcting section 21, a document type discriminating section 22, an input tone correcting section 23 and a segmentation processing section 24, which perform image processing described later on the input RGB analog signal from the color image input apparatus 11. The color image processing apparatus 2 generates image data consisting of RGB digital signal (abbreviation: RGB signal). Hereinafter, the intensity of RGB signal is represented by RGB (r, g, b). Furthermore, the color image processing apparatus 2 includes a color correcting section 25, a black generation and under color removal section 26, a spatial filter processing section 27, an output tone correcting section 28 and a tone reproduction processing section 29, which perform image processing described later on RGB signal. The color image processing apparatus 2 generates image data consisting of CMYK digital signal (C: cyan; M: magenta; Y: yellow; K: black), and outputs the generated image data as stream toward the color image output apparatus 13. The color image processing apparatus 2 may temporally store the generated image data on a storing section 30 that is a non-volatile storage device, such as hard disk, before outputting the generated image data to the color image output apparatus 13.

The color image output apparatus 13 outputs a color image based on the image data input from the color image processing apparatus 2, and then the color image is recorded on the recording sheet, such as a paper, by thermal transfer printing, electronography, ink-jet printing or the like. The color image output apparatus 13 can work as the image forming means according to the present invention. Alternatively, the image forming apparatus 1 may include a monochrome image output apparatus that records and outputs a monochrome image on a recording sheet, instead of the color image output apparatus 13. In the alternative embodiment, the color image processing apparatus 2 converts image data of color image into image data of monochrome image, and then outputs the converted image data to the monochrome image output apparatus.

In the color image processing apparatus 2, the compression processing section 3 performs an image compressing method according to the present invention (described later) on the RGB signal output by the segmentation processing section 24. The color image processing apparatus 2 generates a compression file containing the compressed image data and outputs the generated compression file to the communication device 14. The compression processing section 3 can work as the image compressing apparatus according to the present invention. The color image processing apparatus 2 may temporally store the generated compression file on the storing section 30 before outputting the generated compression file to the color image output apparatus 13.

The communication device 14 consists of a network card, a modem or the like, and can connect to communication network, such as public line, Local Area Network (LAN) or Internet (not shown). The communication device 14 transmits the compression file through the communication network to the outside with utilizing communication method such as a facsimile or an e-mail. For example, in the case that a "scan to e-mail mode" is selected on the control panel 12, the communication device 14 attaches the compression file to the e-mail and then transmits the e-mail to a predetermined destination.

In the case that the communication device 14 performs the facsimile communication, the CPU of the image forming apparatus 1 performs communication procedure with the communication partner apparatus through the communication device 14. After proper communication condition is established, the CPU of the image forming apparatus 1 sequentially transmit the compression file to a destination device, on which required processing has been performed, such as modification of compression format. In the case that the image forming apparatus 1 receives a facsimile through the communication device 14 and the like, the CPU of the image forming apparatus 1 receives the compression file transmitted from an originating communication device during performing the communication procedure with the communication partner apparatus through the communication device 14. The CPU of the image forming apparatus 1 inputs the received compression file into the color image processing apparatus 2. The color image processing apparatus 2 performs decompression processing on the compression file received through a compression/decompression processing section (not shown). The color image processing apparatus 2 performs, according to need, image rotation processing, resolution conversion processing and/or the like on the image data obtained by the decompression of the compression file. These processing may be performed at a not shown processing section. Further, the color image processing apparatus 2 performs on the obtained image data, according to need, correction processing of the output tone on the output tone correcting section 28 and halftone processing of the output tone on the tone reproduction processing section 29. Furthermore, the color image processing apparatus 2 outputs the image data on which several image processing have been performed toward the color image output apparatus 13, and then the color image output apparatus 13 outputs a color image based on the image data output from the color image processing apparatus 2.

Next, it will be described about image processing performed by the color image processing apparatus 2. The A/D converting section 20 receives the RGB analog signal input from the color image input apparatus 11 to the color image processing apparatus 2, converts the received RGB analog signal into RGB digital signal, and outputs the converted RGB signal (i.e., RGB digital signal) to the shading correcting section 21.

The shading correcting section 21 performs several processing on the RGB signal input from the A/D converting section 20 for correcting distortions caused in an image lighting system, an image focusing system and an image sensing system of the color image input apparatus 11. Then, the shading correcting section 21 outputs the corrected RGB signal toward the document type discriminating section 22.

The document type discriminating section 22 converts RGB reflectance signal input from the shading correcting section 21 to RGB image density (pixel value) signal. The document type discriminating section 22 performs discrimination processing of document type based on the RGB signal input from the shading correcting section 21, for determining a proper document mode among the text mode, the printed-picture mode, the photograph (continuous tone) mode and the like. In the case that the discrimination processing of document type is based on the user's manual setting through the control panel 12, the document type discriminating section 22 outputs the input RGB signal from the shading correcting section 21 directly toward the input tone correcting section 23. The results of the discrimination processing affect the following image processing.

The input tone correcting section 23 performs adjustment processing of image quality on the RGB signal, such as adjustment of color balance, removal of page background density and adjustment of contrast. The input tone correcting section 23 then outputs the processed RGB signal to the segmentation processing section 24.

The segmentation processing section 24 separates pixels of the image represented by the RGB signal, which has been input by the input tone correcting section 23, into the pixel of text region, the pixel of halftone dot region and the pixel of photograph region. The segmentation processing section 24 further outputs segmentation class signal, which is based on the separation results and represents a corresponding region of the interest pixel, toward the compression processing section 3, the black generation and under color removal section 26, the spatial filter processing section 27 and the tone reproduction processing section 29. The segmentation processing section 24 furthermore outputs the RGB signal input by the input tone correcting section 23 toward the color correcting section 25 and the compression processing section 3. Alternatively, the segmentation processing section 24 may not output the segmentation class signal to the compression processing section 3.

The color correcting section 25 converts the RGB signal input by the segmentation processing section 24 into CMY digital signal (abbreviation: CMY signal). The color correcting section 25 performs, for reproducing faithful color, a process for removing color impurity on the basis of the spectral characteristics of color materials of CMY including unnecessary absorbed components. The color correcting section 25 then outputs the processed CMY signal to the black generation and under color removal section 26.

The black generation and under color removal section 26 performs black generation processing for generating black (K) signal based on the CMY signal input by the color correcting section 25, and performs new CMY signal generation processing for generating new CMY signal that is the input CMY signal from which the generated K signal by the black generation processing is subtracted. The CMY three color signal is converted into CMYK four color digital signal (abbreviation; CMYK signal). The black generation and under color removal section 26 then outputs the CMYK signal, which is converted from the CMY signal, toward the spatial filter processing section 27.

It is known about skeleton black method as an example for the black generation processing performed by the black generation and under color removal section 26. In the case that the skeleton black method is utilized, that the input output characteristics of skeleton curve is represented by y=f(x), that the input data are represented by C, M and Y, that the output data are represented by C', M', Y' and K', and that Under Color Removal (UCR) rate is represented by α (0<α<1), the C', the M', the Y' and the K' obtained after the processing of the black generation and under color removal section 26 are defined by the following formulas:

$$K'=f(\min(C,M,Y)) \quad (1)$$

$$C'=C-\alpha K' \quad (2)$$

$$M'=M-\alpha K' \quad (3)$$

$$Y'=Y-\alpha K' \quad (4)$$

The UCR rate shows the amount of CMY signal deleted by replacement of K signal. The formula (1) means that the K signal is generated in accordance with the smallest signal intensity among the signal intensities of the C signal, the M signal and the Y signal.

The spatial filter processing section 27 performs spatial filter processing on the image represented by the CMYK signal input from the black generation and under color removal section 26. The spatial filter processing is for correcting the characteristic of spatial frequency and is based on the segmentation class signal input from the segmentation processing section 24. The spatial filter processing works to improve blur of image or degradation of image graininess. For example, in a text region separated by the segmentation processing section 24, the special filter processing section 27 performs the special filter process by using a filter for sharpening a high frequency component so as to improve the reproducibility of a text. Alternatively, in a halftone dot region separated by the segmentation processing section 24, the special filter processing section 27 performs a low-pass filtering process for removing an input halftone component. The spatial filter processing section 27 then outputs the processed CMYK signal toward the output tone correcting section 28.

The output tone correcting section 28 performs, on the CMYK signal input from the special filter processing section 27, an output tone correction process on the basis of a halftone area ratio, that is, a characteristic value of the color image output apparatus 13. The output tone correcting section 28 outputs the processed CMYK signal toward the tone reproduction processing section 29.

The tone reproduction processing section 29 performs halftone processing on the CMYK signal input from the output tone correcting section 28. The halftone processing is based on the segmentation class signal input from the segmentation processing section 24. For example, the tone reproducing processing section 29 utilizes a high resolution screen suitable for reproducing high frequency component, and performs binarization processing or multi-level dithering processing on the region of pixels separated into the text region by the segmentation processing section 24. For example, the tone reproducing processing section 29 utilizes a screen suitable for tone reproduction, and performs binarization processing or multi-level dithering processing on the region of pixels separated into the halftone dot region by the segmentation processing section 24. The tone reproduction processing section 29 then outputs the processed image data toward the color image output apparatus 13.

Next, it will be described about configuration of the compression processing section 3 and about image processing performed by the compression processing section 3. The compression processing section 3 generates a compression file based on the image data of the RGB signal input from the segmentation processing section 24, with utilizing the image compressing method according to the present invention.

The compression processing section 3 inputs image data representing the original color image that is configured with matrix arrangement of pixels. The compression processing section 3 separates such the original image into the foreground layer (binary image) and the background layer. The compression processing section 3 then performs the lossless compression (e.g., MMR) on the foreground layer and performs the lossy compression (e.g., JPEG) on the background layer. Further, the compression processing section 3 generates one file containing the foreground layer compressed by lossless compression, the background layer compressed by the lossy compression and the decompression information for decompressing the compressed foreground layer and the compressed background layer to obtain image data for color image. This file is the compression file. This decompression information may consist of compression format information, index color table (IC table) and the like. Such the compression file has smaller data amount and prevents degradation of image quality greater than a file containing data that is directly compressed from data of the original color image, and than a file containing data that is directly compressed from the foreground layer and data that is directly compressed from the background layer. Furthermore, this embodiment is enough to have lossless compression means for binary image (foreground layer) and lossy compression means for background layer. Therefore, this embodiment works even without three or more types of compression means.

Figure 2:
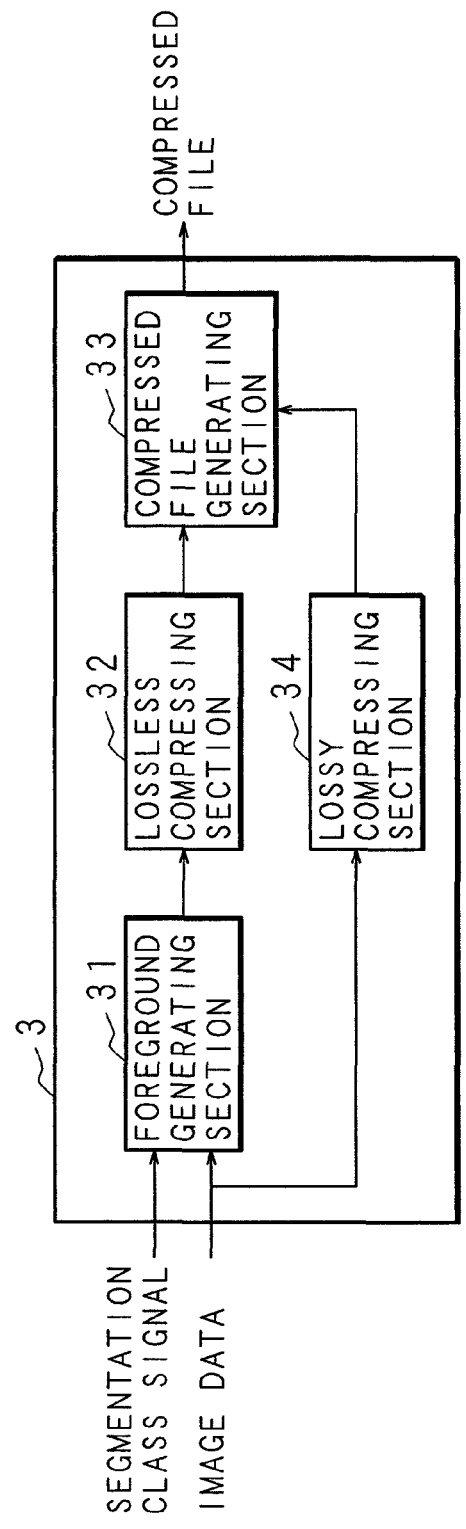
FIG. 2 is a block diagram showing an example of inner components included by a compression processing section.
Figure 3:
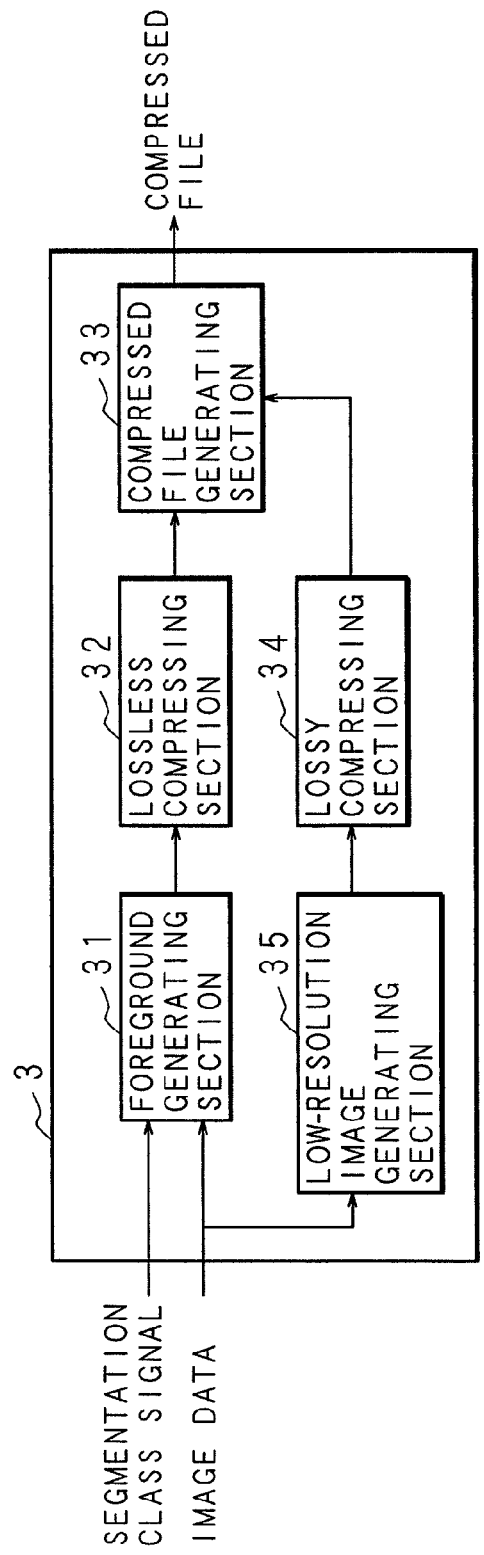
FIG. 3 is a block diagram showing an example of inner components included by a compression processing section.

FIG. 2 and FIG. 3 are block diagrams showing examples of inner components included by the compression processing section 3. The example shown by FIG. 2 is in the case that the original image itself is utilized as the background layer. The compression processing section 3 includes: a foreground generating section 31 that generates a foreground layer representing a text; a lossless compressing section 32 that compresses the foreground layer; lossy compressing section 34 that compresses a background layer (layer representing the original image, i.e., complete-view layer); and a compressed file generating section 33. The segmentation class signal input by the segmentation processing section 24 is input into the foreground layer generating section 31. The image data of RGB signal input by the segmentation processing section 24 is input into the foreground layer generating section 31 and the lossy compressing section 34. The foreground layer generating section 31 extracts signal for the text region from the segmentation class signal, generates a binary image which is represented by binary number for detecting pixels of the text edge, and thus generates the foreground layer. In the alternative embodiment that the segmentation class signal is not input from the segmentation processing section 24, the foreground layer generating section 31 performs processing for detecting the text edge, and thus generates the binary image.

For the detection processing of the text edge, it may be possible to utilize filter processing with a well-known filter, such as Sobel filter and Laplacian filter.

The foreground layer generating section 31 outputs the generated foreground layer to the lossless compressing section 32. The lossless compressing section 32 performs the lossless compression on the foreground layer that is input from the foreground layer generating section 31. The lossy compressing section 34 performs the lossy compression on the image data that is input from the segmentation processing section 24. The lossless compressing section 32 outputs the foreground layer, on which the lossless compression is performed, toward the compressed file generating section 33. The lossy compressing section 34 outputs the complete-view layer, on which the lossy compression is performed, toward the compressed file generating section 33. The foreground layer generating section 31 further inputs required information, such as the IC table, into the compressed file generating section 33 through the lossless compressing section 32. The lossless compressing section 32 and the lossy compressing section 34 input required information, such as the compression format information, into the compressed file generating section 33. The compressed file generating section 33 puts the data compressed by the lossless compression, the data compressed by the lossy compression and the decompression data (e.g., the IC table) together into the compression file.

The example shown by FIG. 3 is in the case that it utilizes a processed image with low-resolution processing based on the original image as the complete-view layer. The compression processing section 3 includes a low-resolution image generating section 35, in addition to the foreground layer generating section 31, the lossless compressing section 32, the lossy compressing section 34 and the compressed file generating section 33. The image data input by the segmentation processing section 24 is input into the foreground layer generating section 31 and the low-resolution image generating section 35. The low-resolution image generating section 35 converts the original image, which is represented by the image data input from the segmentation processing section 24 (the complete-view layer), into a low-resolution image. Then, the low-resolution image generating section 35 outputs the converted low-resolution image toward the lossy compressing section 34. The lossy compressing section 34 performs the lossy compression on the low-resolution image that is input from the low-resolution generating section 35. Then, the lossy compressing section 34 outputs the data compressed by the lossy compression toward the compressed file generating section 33. The foreground layer generating section 31, the lossless compressing section 32 and the compressed file generating section 33 perform processes as described above. The data amount of the compression file can be decreased by utilizing the low-resolution image converted from the complete-view layer.

Figure 4:
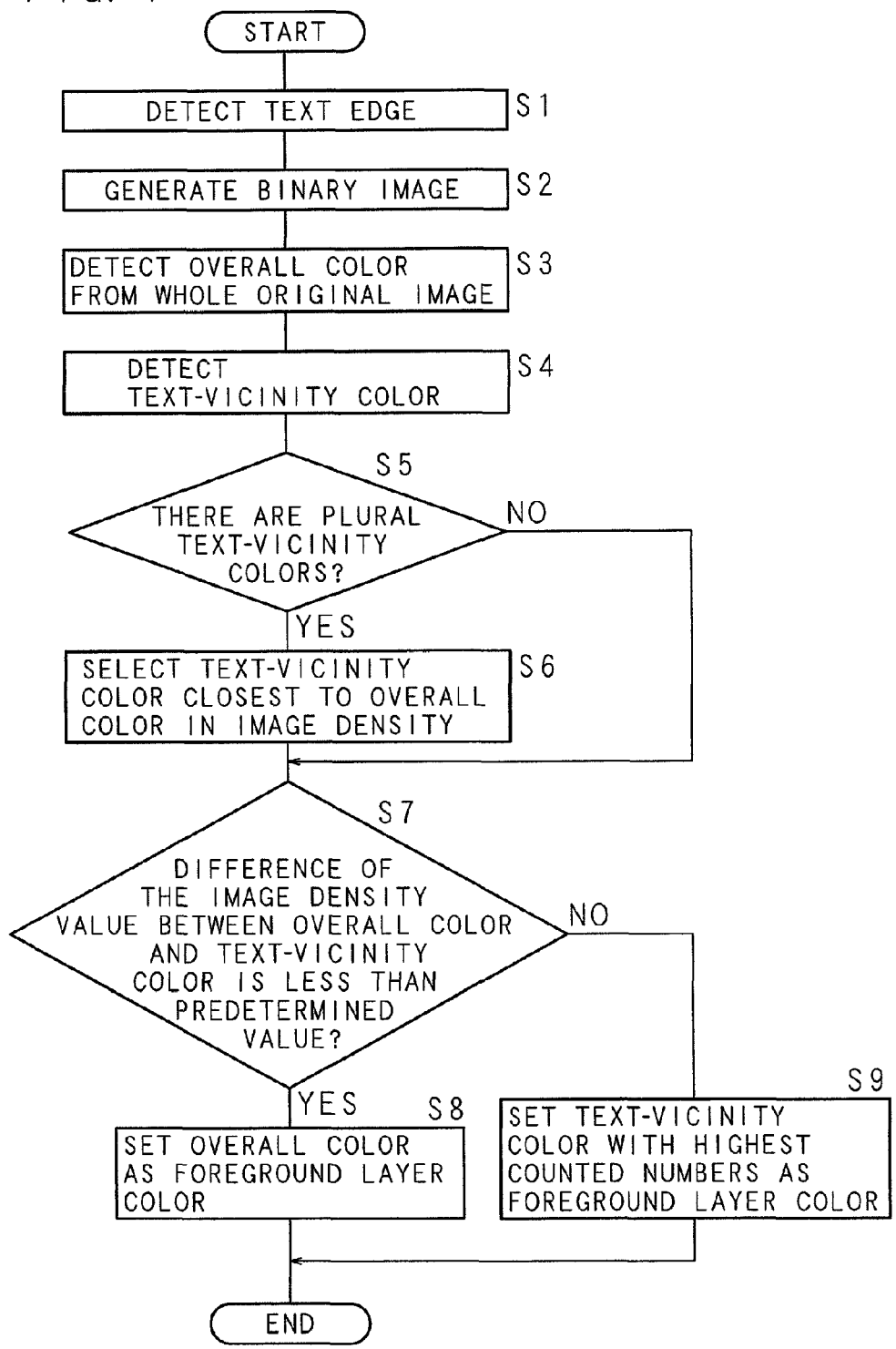
FIG. 4 is a flowchart showing a procedure performed by a foreground layer generating section.

FIG. 4 is a flowchart showing a procedure performed by the foreground layer generating section 31. The foreground layer generating section 31 detects the text edge on the original image represented by the image data that is input from the segmentation processing section 24 (S1). The text edge detection is based on the text region signal contained in the segmentation class signal that is input from the segmentation processing section 24, and the text region signal is configured to represent pixels positioned on the text region. The foreground layer generating section 31 generates the binary image which is represented by binary number for detecting pixels of the text edge (S2). On the binary image, the foreground layer generating section 31 may set pixels of the detected text edge as "1" and set other pixels as "0". The binary image generated at the step S2 is the foreground layer.

Figures 5A, 5B, 5C:
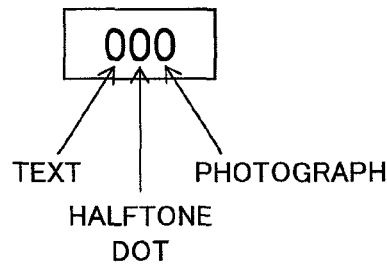
FIG. 5A, FIG. 5B and FIG. 5C are schematic views showing examples about binary image in which the text edge is represented with binary number.

FIG. 5A, FIG. 5B and FIG. 5C are schematic views showing examples about the binary image in which the text edge is represented with the binary number. The example shown in FIG. 5A is the format of the segmentation class signal. In FIG. 5A, the segmentation class signal consists of three bits. The left bit represents the text region, the center bit represents the halftone dot region and the right bit represents photograph region. The numeral "1" being set to the bit means that the pixel corresponding to the bit is positioned on the region corresponding to the bit. The numeral "0" being set to the bit means that the pixel corresponding to the bit is not positioned on the region corresponding to the bit. The example shown in FIG. 5B is the original image whose pixels are represented by the segmentation class signal. The text on the original image is detected by evaluating the number "1" and "0" of bits corresponding to the text region in the original image. The text edge on the original image is detected by identifying pixels around which 2, 4 or 8 nearest neighbor of text and/or line art pixels exist, among the pixels detected as the text region, and by subtracting the identified pixels from the pixels detected as the text region, because the remaining pixels after the subtraction represent the pixels of the text edge. The binary image is generated by setting "1" to the pixels of the text edge and by setting "0" to the other pixels. The example shown in FIG. 5C is the binary image based on the segmentation class signal shown in FIG. 5B.

In the alternative embodiment that the segmentation class signal is not input from the segmentation processing section 24, the foreground layer generating section 31 detects the text edge with utilizing the filter processing at the step S1 and generates the binary image at the step S2. FIG. 6A, FIG. 6B, FIG. 7A and FIG. 7B are schematic views showing examples about binary image generated with a filter processing for detecting the text edge. The example shown in FIG. 6A is an image whose pixels are represented by image densities from "0" to "255". The example shown in FIG. 6B is the 3×3 Laplacian filter. The example shown in FIG. 7A is the processed image of FIG. 6A on which the filter processing is performed with the filter of FIG. 6B. The numeral "0" is set as the image density to the pixels positioned on regions other than the text edge region. Thus, the text edge is detected by identifying pixels whose image densities are more than "0". Furthermore, the binary image is generated by replacing the image density whose value is more than a predetermined threshold with the numeral "1", and by replacing the image density whose value is not more than the predetermined threshold with the numeral "0". The example shown in FIG. 7B is the binary image based on the image shown in FIG. 7A, and utilizes the numeral "127" as the predetermined threshold.

The foreground layer generating section 31 detects overall color from whole of the original image represented by the image data (S3). The overall color is the representative color for whole of the original image. At the step S3, the foreground layer generating section 31 divides whole of the original image into a plurality of blocks, counts the number of pixels for each image density in each block, and thus obtains the representative density value for each block. Furthermore, the foreground layer generating section 31 counts the number of blocks for each representative density value and decides the overall color represented by the representative density value whose counted number is the highest among the obtained representative density values. The density values may be obtained for respective colors of R, G, and B.

The foreground layer generating section 31 detects text-vicinity color from pixels of the original image represented by the image data (S4). The text-vicinity color is the representative color for pixels positioned at the vicinity of the text edge among the pixels of the original image. At the step S4, the foreground layer generating section 31 sequentially selects an interest pixel among the pixels of the original image, and determines whether the interest pixel corresponds to the text edge or not. When having determined that the interest pixel corresponds to the text edge, the foreground layer generating section 31 counts the number of pixels, positioned outer of the text region, for each image density in each block configured with a plurality of pixels that are centered around the interest pixel. Thus, the foreground layer generating section 31 obtains the representative text-vicinity value for each block. The block utilized at the step S4 is smaller than the block utilized at the step S3. It should be noted that the block of the step S4 has a predetermined pixel area and that the pixels within the predetermined pixel area of the block are positioned within a predetermined range from the pixel corresponding to the text edge. Furthermore, the foreground layer generating section 31 counts the number of representative text-vicinity values for each image density value and decides the text-vicinity color represented by the representative text-vicinity value whose counted number is the higher than a predetermined threshold.

The foreground layer generating section 31 determines whether there are plural text-vicinity colors whose counted numbers are higher than the predetermined threshold or not (S5). When having determined that there are plural text-vicinity colors whose counted numbers are higher than the predetermined threshold (S5: YES), the foreground layer generating section 31 picks up the text-vicinity color whose image density value is closest to the image density value of the overall color among the plural text-vicinity colors (S6). When the step S6 is completed or when the foreground layer generating section 31 has determined that there are not plural text-vicinity colors whose counted numbers are higher than the predetermined threshold (S5: NO), the foreground layer generating section 31 determines whether a difference of the image density value between the overall color and the picked up text-vicinity color is less than a predetermined value or not (S7). When having determined that the difference is less than the predetermined value (S7: YES), the foreground layer generating section 31 sets the overall color detected at the step S3 as foreground layer color (S8). When having determined that the difference is not less than the predetermined value (S7: NO), the foreground layer generating section 31 sets the text-vicinity color whose counted numbers are highest as the foreground layer color (S9).

The foreground layer generating section 31 completes the procedure and outputs the generated foreground layer (binary image) and the information representing the set foreground layer color toward the lossless compressing section 32. Thus, information of the foreground layer color is stored in the IC table and is contained in the compression file. When the compression file is decompressed, the text edge is reproduced with the set foreground layer color. Thus, each text is edged with the foreground layer color on the reproduced image.

It can be assumed about the case that the foreground layer generating section 31 cannot set the overall color and the text-vicinity color since the original image is illustrated with high variety of colors and thus the counted numbers of the representative density value and/or the text-vicinity value does not reach to the corresponding threshold. In such the assumed case, the foreground layer generating section 31 may perform processing for setting achromatic color as the foreground layer color. It may be configured to utilize white color or gray color having a predetermined image density. Alternatively, the foreground layer generating section 31 may be configured to unconditionally set the achromatic color as the foreground layer color. In this alternative embodiment, the text edge is reproduced with the achromatic color, such as the white color, when the compression file is decompressed. Thus, each text is edged with the achromatic color on the reproduced image.

Figure 8A:
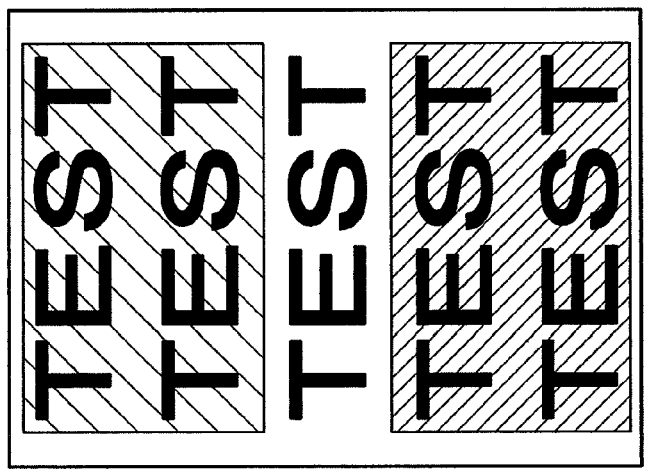
FIG. 8A, FIG. 8B and FIG. 8C are schematic views showing examples of original image.
Figure 8B:
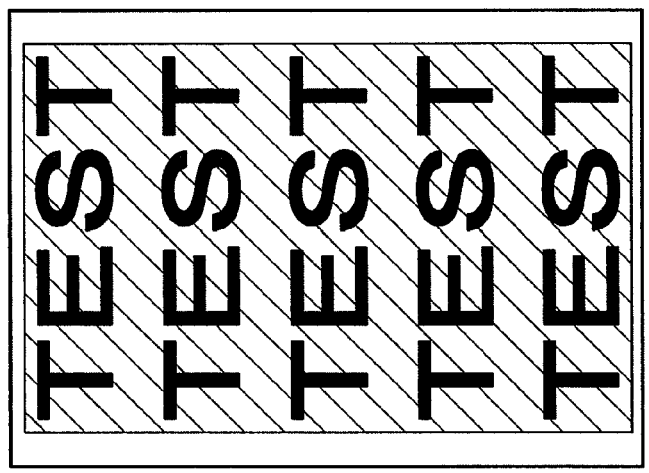
Figure 8C:
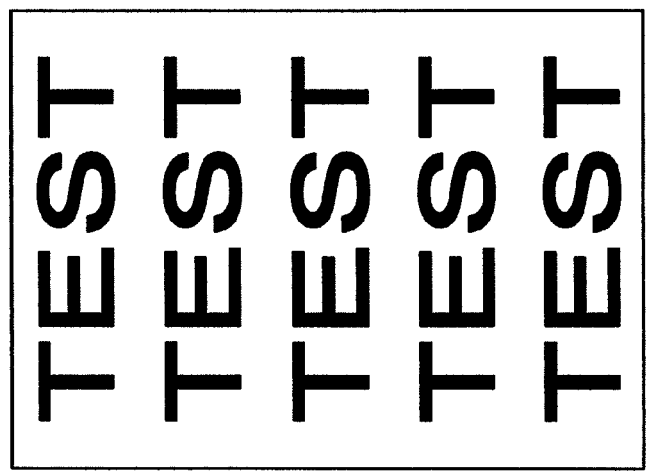
Figure 9:
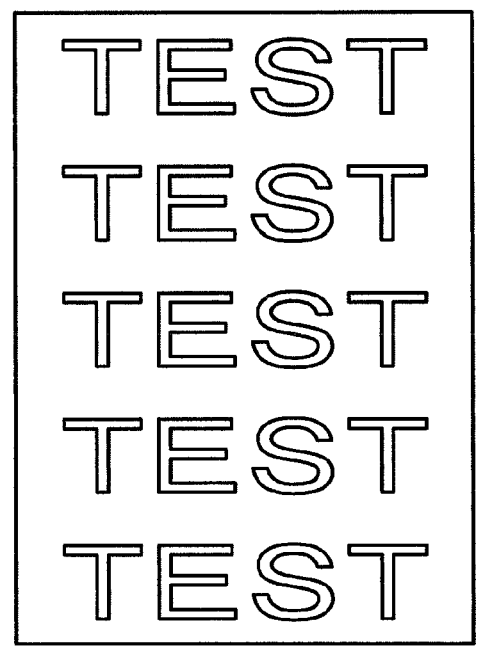
FIG. 9 is a schematic view showing an example about detection result of the text edge.

Next, it will be described about image processing for generating the background layer (in other word, the complete-view layer based on the original image). FIG. 8A, FIG. 8B and FIG. 8C are schematic views showing examples of the original image. The example shown in FIG. 8A is the original image on which the background of the text is filled with white color (achromatic color). The example shown in FIG. 8B is the original image on which the background of the text is filled with chromatic color. The example shown in FIG. 8C is the original image on which the background of the text is filled with plural colors. FIG. 9 is a schematic view showing an example about detection result of the text edge. The example shown in FIG. 9 is the binary image generated from the original image shown in FIG. 8A, FIG. 8B and FIG. 8C with detecting the text edge. In FIG. 9, the pixels having the image density value "1" are represented with the black color and the pixels having the image density value "0" are represented with the white color.

Figure 10A:
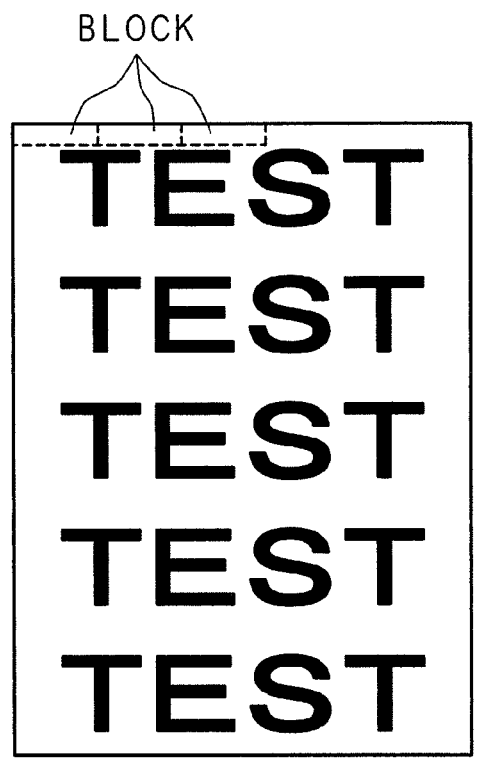
FIG. 10A and FIG. 10B are schematic views showing examples about overall color obtained from the original image shown in FIG. 8A.
Figure 10B:
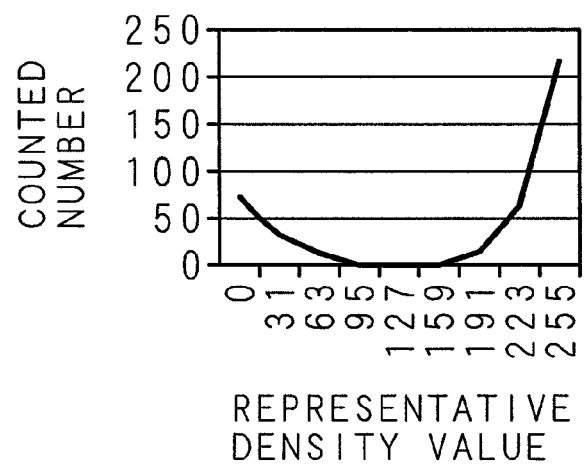

FIG. 10A and FIG. 10B are schematic views showing examples about the overall color obtained from the original image shown in FIG. 8A. The foreground layer generating section 31 obtains the representative density value for each block having divided the whole of the original image as shown in FIG. 10A at the step S3. Although three blocks are illustrated in FIG. 10A and divide a part of the original image for illustration purpose, whole of the original image is actually divided into plural blocks. The foreground layer generating section 31 calculates average value of the pixels contained in each block, rounds the calculated average value, and sets the rounded value as the representative density value for each block. The following calculation method may be utilized as the round processing of the average value. Assume the case that the image density value is represented with 8 bits and with a numeral "0" to "255". In this assumption, a numeral "0" is provided with the image density value and then the image density value is represented with 9 bits. Then, "+16" is provided with the image density and logical multiplication is performed with the image density for each bit and the "480" (binary numeral: 111100000) whose bits from the first to fourth are represented by "1" and whose bits from fifth to ninth are represented by "0". When the logical multiplication results in the value no less than "32", "−1" is added to the result value. Thus, the added result value is utilized as the rounded image density value. For example, in the case that the image density value is "255", it performs: the processing 255+16=27 (binary numeral: 100001111); and the logical multiplication processing 100001111 & 111100000 (480)= 100000000 (256). The result value "256" is no less than "32", and thus "−1" is added to the result value (256−1=255). If the result value is less than "32", the result value is utilized as the rounded image density value. Such the calculation method changes each image density value into any one of "0", "31", "63", "95", "127", "159", "191", "223" and "255". The foreground layer generating section 31 counts the representative density values for the blocks. The example shown in FIG. 10B is a characteristic chart of the counted results in which the horizontal axis shows the representative density values and the vertical axis shows the counted number for each representative density value. The counted number corresponds to the number of blocks having the same amount of the representative density value. Based on the counted results shown in FIG. 10B, the foreground layer generating section 31 sets the representative density value "255", whose counted number is the highest, as the overall color.

Figure 11A:
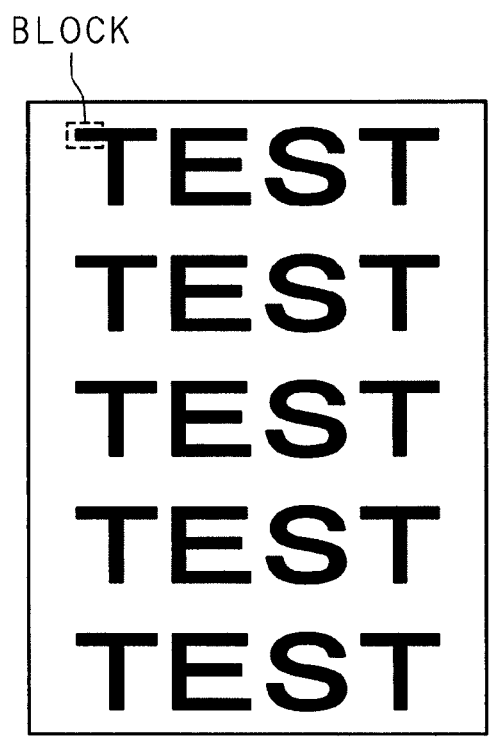
FIG. 11A and FIG. 11B are schematic views showing examples about text-vicinity color obtained from the original image shown in FIG. 8A.
Figure 11B:
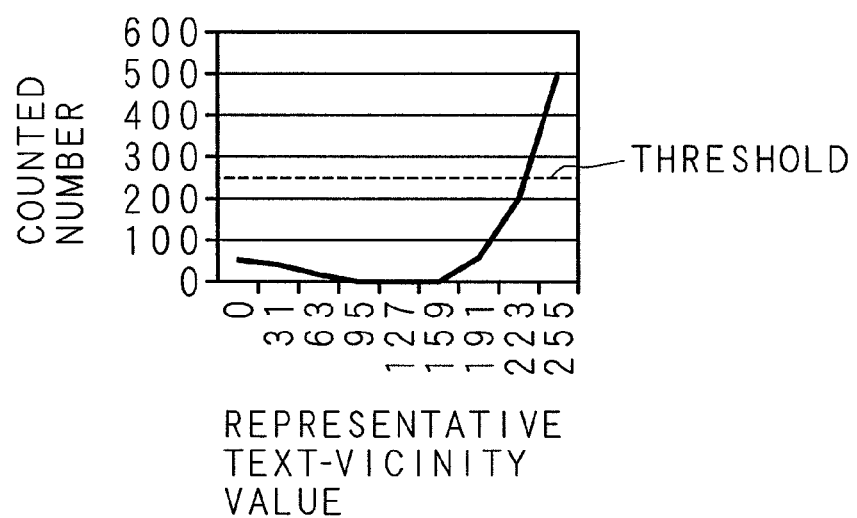

FIG. 11A and FIG. 11B are schematic views showing examples about text-vicinity color obtained from the original image shown in FIG. 8A. When the interest pixel at the step S4 is represented by the image density value "1" on the binary image as shown in FIG. 11A on which the detection processing of the text edge is performed, the foreground layer generating section 31 calculates average value of the image density values provided with the pixels outside of the text region among all the pixels contained in the block that arranges the interest pixel at the center. Then, the foreground layer generating section 31 rounds the calculated average value, and thus sets the rounded value as the representative text-vicinity value. The block utilized at the step S4 is smaller than the block utilized at the step S3. Furthermore, each block utilized at the step S4 arranges each pixel of the original image at the center. Thus, the block utilized at the step S4 overlaps with another block utilized at the step S4. The foreground layer generating section 31 counts the representative text-vicinity values of all the pixels corresponding to the text edge. The example shown in FIG. 11B is a characteristic chart of the counted results in which the horizontal axis shows the representative text-vicinity values and the vertical axis shows the counted number for each representative text-vicinity value. The counted number corresponds to the number of pixels configured with the same amount of the representative text-vicinity value. The foreground layer generating section 31 sets the representative text-vicinity value "255", whose counted number is higher than a predetermined threshold, as the text-vicinity color. The FIG. 10B and FIG. 11B shows that the-vicinity color is only one and the absolute difference between the overall color and the text-vicinity color is less than a predetermined threshold (e.g., 64). Thus, the foreground layer generating section 31 sets the detected overall color (255) as the foreground layer color.

Figure 12C:
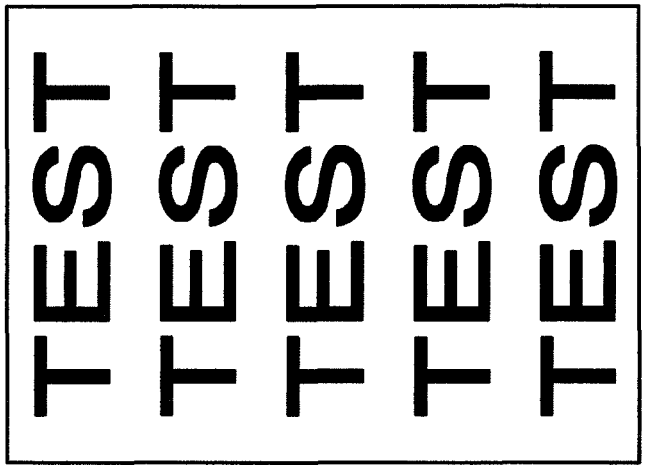
FIG. 12A, FIG. 12B and FIG. 12C are views showing results of image processing performed on the original image shown in FIG. 8A.
Figure 12B:
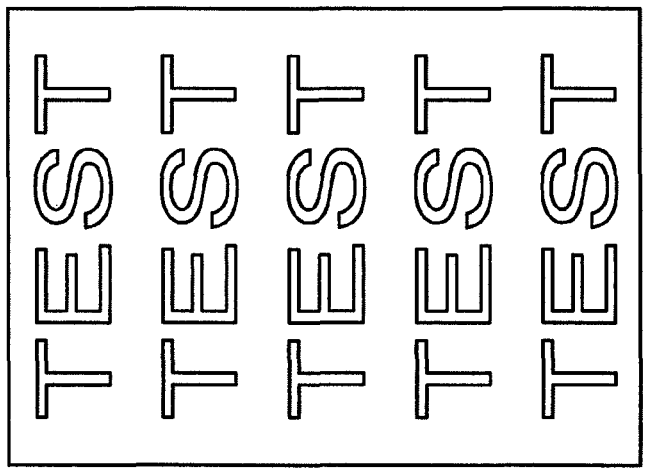
Figure 12A:
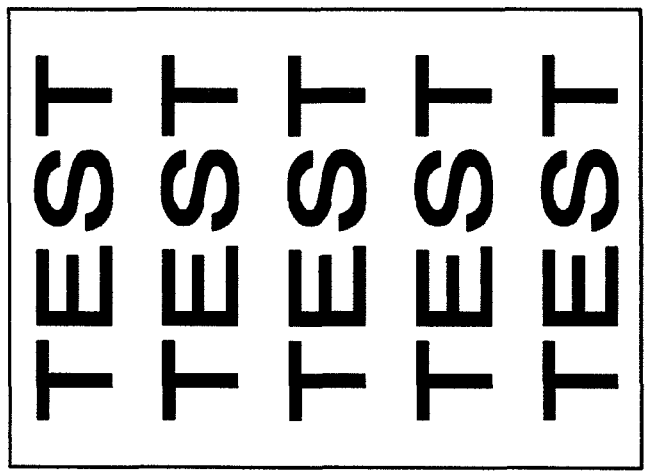

FIG. 12A, FIG. 12B and FIG. 12C are views showing results of image processing performed on the original image shown in FIG. 8A. The example shown in FIG. 12A is the complete-view layer, and the example shown in FIG. 12B is the foreground layer. The complete-view layer is almost the same as the original image, and the foreground layer is the binary image for showing the text edge. Although the text edge in FIG. 12B is illustrated with the black color for illustration purpose, the text edge is actually illustrated with the white color and the other part of the text edge is illustrated with clear and colorless. The foreground layer is compressed with the lossless compression, the complete-view layer is compressed with the lossy compression, and thus the compression file is generated. The example shown in FIG. 12C is the image reproduced by the decompression of the compression file. In FIG. 12C, the text edge is reproduced with the white color (overall color) and the text is edged with the white color.

Figure 13A:
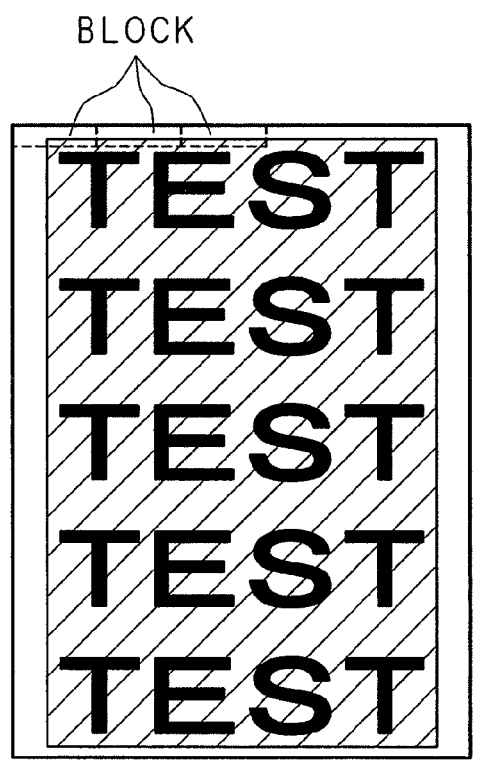
FIG. 13A and FIG. 13B are schematic views showing examples about the overall color obtained from the original image shown in FIG. 8B.
Figure 13B:
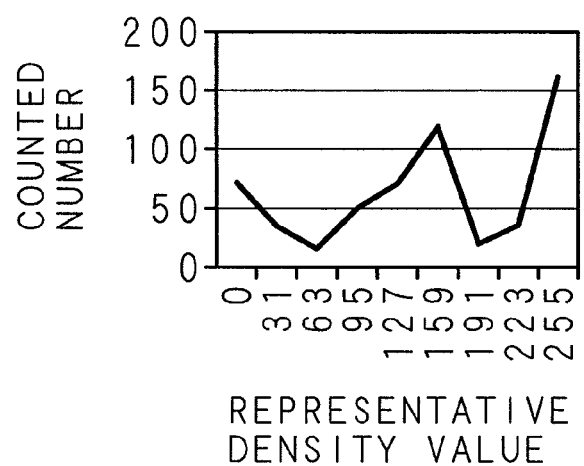

FIG. 13A and FIG. 13B are schematic views showing examples about the overall color obtained from the original image shown in FIG. 8B. The foreground layer generating section 31 divides whole of the original image into a plurality of blocks as shown in FIG. 13A, obtains the representative density value for each block at the step S3, and then counts the representative density values of the blocks. The example shown in FIG. 13B is a characteristic chart of the counted results in which the horizontal axis shows the representative density values and the vertical axis shows the counted number for each representative density value. Based on the counted results shown in FIG. 13B, the foreground layer generating section 31 sets the representative density value "255", whose counted number is the highest, as the overall color.

Figure 14A:
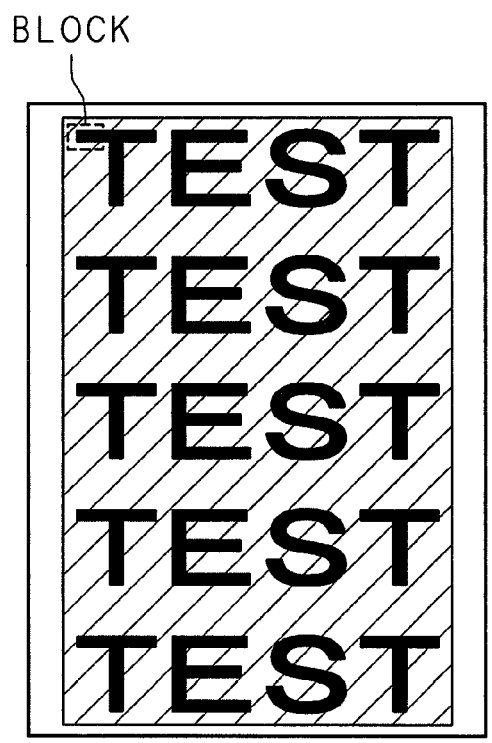
FIG. 14A and FIG. 14B are schematic views showing examples about the text-vicinity color obtained from the original image shown in FIG. 8B.
Figure 14B:
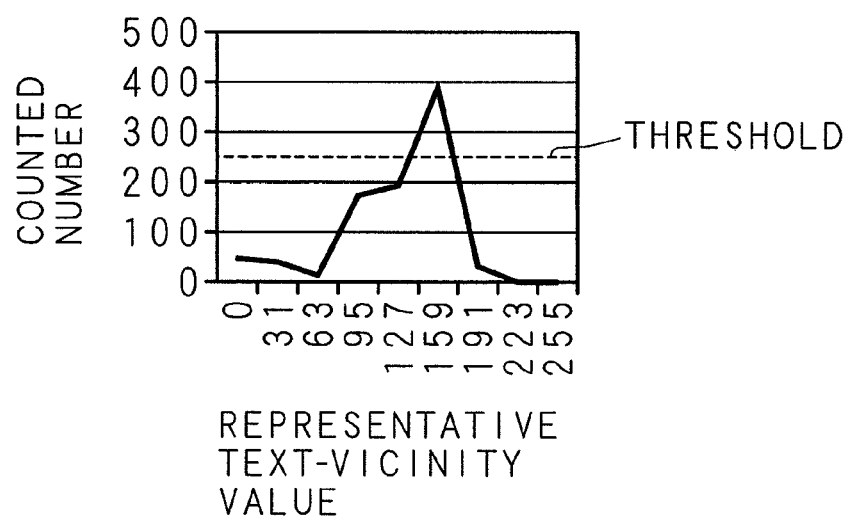

FIG. 14A and FIG. 14B are schematic views showing examples about the text-vicinity color obtained from the original image shown in FIG. 8B. When the interest pixel at the step S4 is represented by the image density value "1" on the binary image as shown in FIG. 14A on which the detection processing of the text edge is performed, the foreground layer generating section 31 obtains the representative text-vicinity value of the image density values provided with the pixels outside of the text region among all the pixels contained in the block that arranges the interest pixel at the center. Then, the foreground layer generating section 31 counts the representative text-vicinity values of all the pixels corresponding to the text edge. The example shown in FIG. 14B is a characteristic chart of the counted results in which the horizontal axis shows the representative text-vicinity values and the vertical axis shows the counted number for each representative text-vicinity value. In the case that the predetermined threshold value is "250", the foreground layer generating section 31 sets the representative text-vicinity values "159", whose counted number is higher than the predetermined threshold, as the text-vicinity color. The FIG. 13B and FIG. 14B shows that the-vicinity color is only one and the absolute difference between the overall color and the text-vicinity color is no less than the predetermined threshold (64). Thus, the foreground layer generating section 31 sets the detected text-vicinity color (159) as the foreground layer color.

Figure 15C:
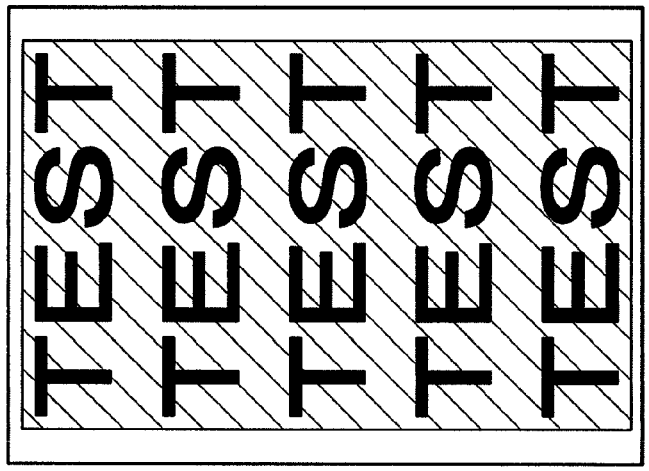
FIG. 15A, FIG. 15B and FIG. 15C are views showing results of image processing performed on the original image shown in FIG. 8B.
Figure 15B:
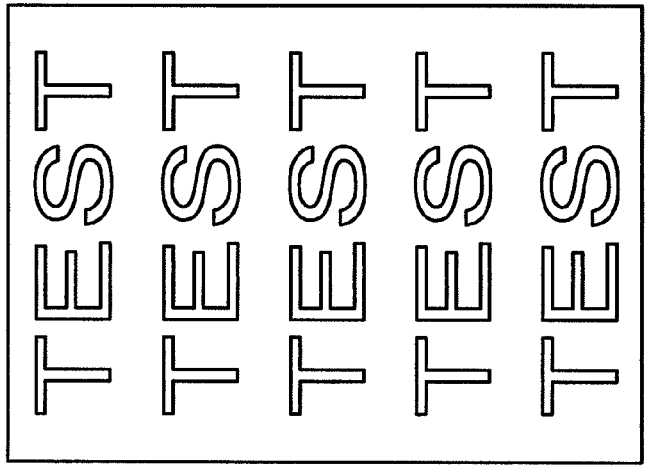
Figure 15A:
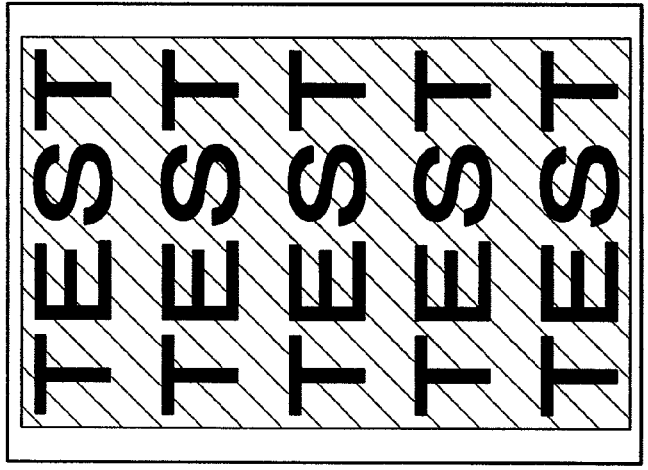

FIG. 15A, FIG. 15B and FIG. 15C are views showing results of image processing performed on the original image shown in FIG. 8B. The example shown in FIG. 15A is the complete-view layer, and the example shown in FIG. 15B is the foreground layer. The complete-view layer is almost the same as the original image, and the foreground layer is the binary image for showing the text edge. Although the text edge in FIG. 15B is illustrated with the black color for illustration purpose, the text edge is actually illustrated with the text-vicinity color. The example shown in FIG. 15C is the image reproduced by the decompression of the compression file. In FIG. 15C, the text edge is reproduced with the text-vicinity color whose image density value is "159" and each text is edged with the text-vicinity color whose image density value is "159".

Figure 16A:
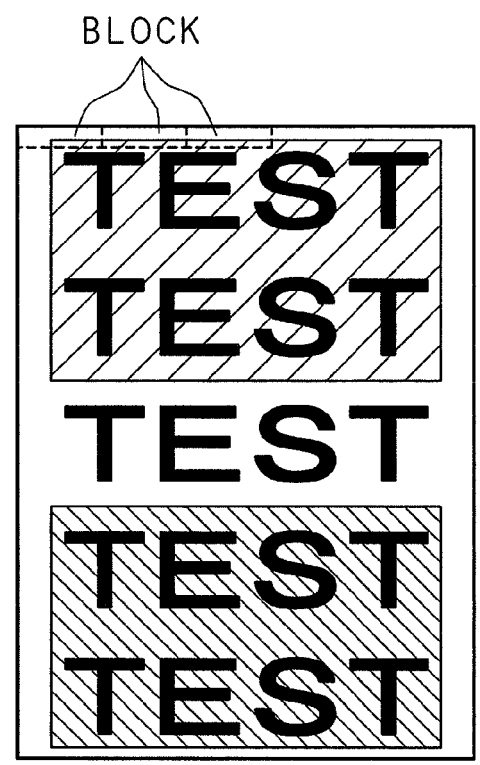
FIG. 16A and FIG. 16B are schematic views showing examples about the overall color obtained from the original image shown in FIG. 8C.
Figure 16B:
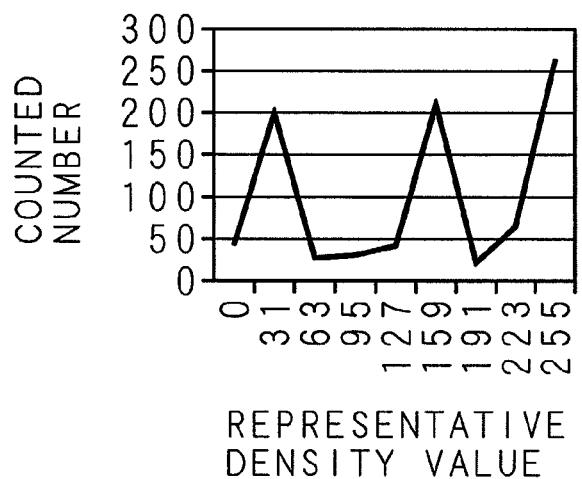

FIG. 16A and FIG. 16B are schematic views showing examples about the overall color obtained from the original image shown in FIG. 8C. The foreground layer generating section 31 divides whole of the original image into a plurality of blocks as shown in FIG. 16A, obtains the representative density value for each block at the step S3, and then counts the representative density values of the blocks. The example shown in FIG. 16B is a characteristic chart of the counted results in which the horizontal axis shows the representative density values and the vertical axis shows the counted number for each representative density value. Based on the counted results shown in FIG. 16B, the foreground layer generating section 31 sets the representative density value "255", whose counted number is the highest, as the overall color.

Figure 17A:
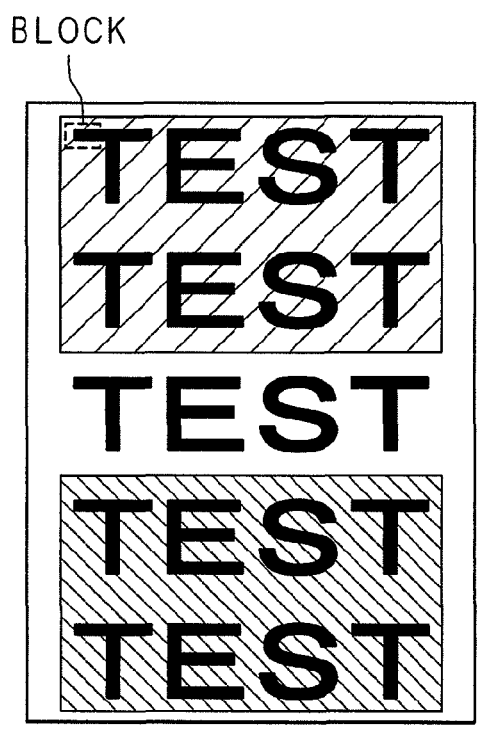
FIG. 17A and FIG. 17B are schematic views showing examples about the text-vicinity color obtained from the original image shown in FIG. 8C.
Figure 17B:
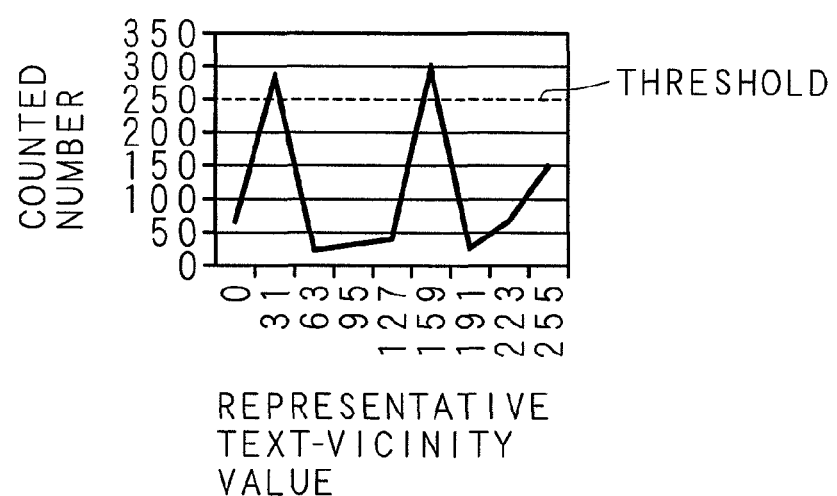

FIG. 17A and FIG. 17B are schematic views showing examples about the text-vicinity color obtained from the original image shown in FIG. 8C. When the interest pixel at the step S4 is represented by the image density value "1" on the binary image as shown in FIG. 17A on which the detection processing of the text edge is performed, the foreground layer generating section 31 obtains the representative text-vicinity value of the image density values provided with the pixels outside of the text region among all the pixels contained in the block that arranges the interest pixel at the center. Then, the foreground layer generating section 31 counts the representative text-vicinity values of all the pixels corresponding to the text edge. The example shown in FIG. 17B is a characteristic chart of the counted results in which the horizontal axis shows the representative text-vicinity values and the vertical axis shows the counted number for each representative text-vicinity value. In the case that the predetermined threshold value is "250", the foreground layer generating section 31 sets the representative text-vicinity values "31" and "159", whose counted numbers are higher than the predetermined threshold, as the text-vicinity colors. The foreground layer generating section 31 then selects the text-vicinity color whose image density value is "159" at the step S6, because the image density value "159" has smaller difference from the image density value of the overall color than the image density value "31". Furthermore, absolute difference between the overall color (255) and the text-vicinity color (159) is no less than the predetermined threshold (64), and counted number of the image density value "159" is the highest among the set text-vicinity colors. The foreground layer generating section 31 sets the detected text-vicinity color (159) as the foreground layer color.

FIG. 18A, FIG. 18B and FIG. 18C are views showing results of image processing performed on the original image shown in FIG. 8C. The example shown in FIG. 18A is the complete-view layer, and the example shown in FIG. 18B is the foreground layer. The complete-view layer is almost the same as the original image, and the foreground layer is the binary image for showing the text edge. Although the text edge in FIG. 18B is illustrated with the black color for illustration purpose, the text edge is actually illustrated with the text-vicinity color whose image density value is "159". The example shown in FIG. 18C is the image reproduced by the decompression of the compression file. In FIG. 18C, the text edge is reproduced with the text-vicinity color whose image density value is "159" and each text is edged with the text-vicinity color whose image density value is "159".

Figure 19:
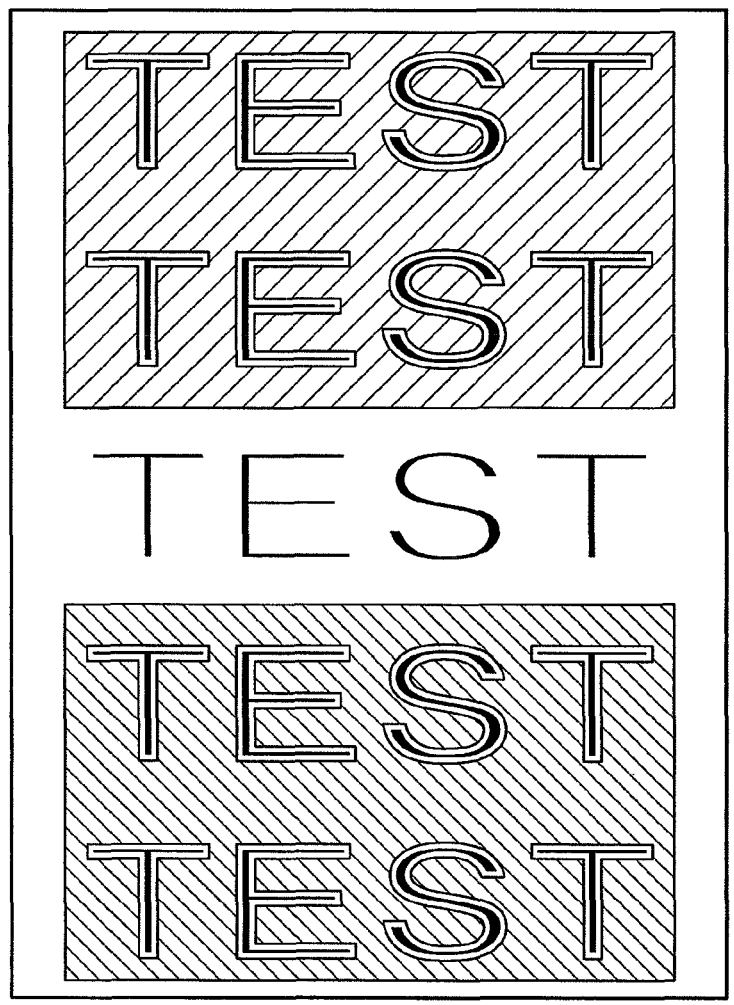
FIG. 19 is a schematic view showing an image obtained by the decompression of a compressed file, in which the color of foreground layer is set to be white color and the original image shown in FIG. 8C is compressed.

In the case that the foreground layer generating section 31 sets achromatic color as the foreground layer color, the text edge is reproduced with the achromatic color, such as the white color. FIG. 19 is a schematic view showing the image obtained by the decompression of the compressed file, in which the foreground layer color is set to be the white color and the original image shown in FIG. 8C is compressed. The text edge is reproduced with the white color and each text is edged with the white color in the reproduced image.

As described above, the embodiment according to the present invention detects the text edge in the original image, generates the foreground layer in which the detected text edge is represented with the binary image, sets the foreground color which is different from the color of text, compresses the foreground layer with the lossless compression, utilizes the original image as the background layer, and compresses the original image with the lossy compression, during the compression processing of the original image containing the text. This embodiment detects the text edge, instead of the whole region of the text, and generates the foreground layer. Therefore, it is possible to ease separating the text from the background, and to prevent being difficult to read the text on the image in which the compression processing has been performed. Furthermore, this embodiment sets the foreground layer color different from the color of text. The text edge is reproduced with the set specific color, and each text is edged with the set specific color on the image reproduced from the compression file. Therefore, it is possible to improve the visual recognition of the text. Moreover, this embodiment compresses the complete-view layer (in other words, background layer) with the lossy compression. Therefore, it is possible to reduce data size of the compression file.

The embodiment according to the present invention sets the overall color as the foreground layer color that is the representative color for whole region of the original image. The text edge is reproduced with the overall color, and each text is edged with the page background color on the image reproduced from the compression file. Therefore, it is possible to clearly show the boundary between the text region and the background, and to improve the visual recognition of the text. Furthermore, it is possible to prevent the text from being edged with the color unfitting for the whole region of the reproduced image, and to prevent reduction of the image reproducibility.

The embodiment according to the present invention can sets the text-vicinity color as the foreground layer color that indicates the color at the vicinity of the text in the original image. The text edge is reproduced with the text-vicinity color, and each text is edged with the text-vicinity color. Furthermore, the embodiment sets the text-vicinity color as the foreground layer color when there is large difference between the overall color and the text-vicinity color. Therefore, even in the case that the original image has the text vicinity region illustrated with a color different from other regions, it is possible to prevent the text from being edged with the color unfitting for the text vicinity region of the reproduced image, and to prevent reduction of the image reproducibility.

The embodiment according to the present invention can sets the achromatic color as the foreground layer color that is white color, gray color having a predetermined image density value or the like. In the case that the original image comes from the optically read document, the color of page background on the original image is generally illustrated with the achromatic color, such as the white color or the light gray color. The text edge is reproduced with the achromatic color that is the color of page background, and each text is edged with the achromatic color that is the color of page background. Therefore, it does not require utilizing the chromatic color for setting the foreground layer color. In addition, the achromatic color has smaller information amount than the chromatic color. Therefore, it is possible to simplify the image compression processing, and to reduce data size of the compression file. Furthermore, the embodiment can set the achromatic color as the foreground layer color, even in the case that the original image is illustrated with a great variety of colors and thus the overall color and the text-vicinity color cannot be set properly. Therefore, it is possible to edge each text with the color fitting for the whole region of the reproduced image as much as possible.

The embodiment according to the present invention alternatively performs the low-resolution processing on the complete-view layer utilized as the background layer, before compressing the complete-view layer with the lossy compression. However, the embodiment according to the present invention can utilize the foreground layer for reproducing fine shape of the text contained in the original image. The low-resolution processing on the complete-view layer causes minimal influence on the image reproducibility. Therefore, it is possible to reduce data size of the compression file without degradation of the image reproducibility.

Embodiment 2

Figure 20:
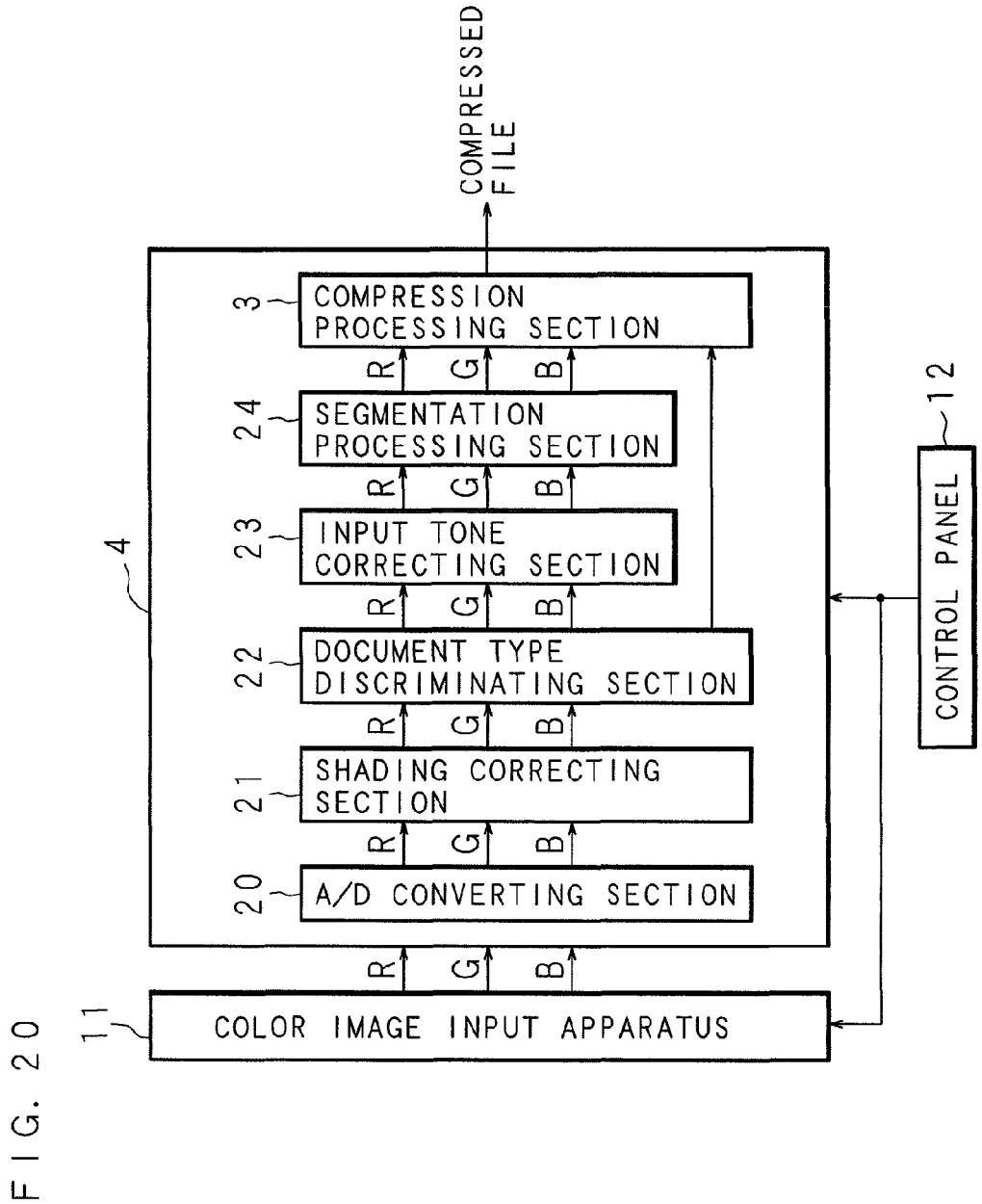
FIG. 20 is a block diagram showing functional components included in a scanner apparatus containing the image forming apparatus according to embodiment 2.

The image compressing apparatus according to the present invention is described in embodiment 2 to be a part of scanner apparatus, although described in embodiment 1 to be a part of the image forming apparatus. FIG. 20 is a block diagram showing functional components included in the scanner apparatus containing the image forming apparatus according to the embodiment 2. The scanner apparatus includes the color image input apparatus 11 that optically reads out a color image from a document, and is connected to an image processing apparatus 4. The image processing apparatus 4 is connected to a host apparatus (not shown), such as a personal computer (PC), through communication cable or communication network. The control panel 12 is connected to the color image input apparatus 11 and the image processing apparatus 4.

The color image input apparatus 11 performs image processing, similarly in embodiment 1, and outputs the RGB analog signal obtained from the read color image toward the image processing apparatus 4. The image processing apparatus 4 converts the analog signal input by the color image input apparatus 11 into the digital signal with utilizing the A/D converting section 20. Then, the image processing apparatus 4 transmits the converted digital signal to the shading correcting section 21, the document type discriminating section 22, the input tone correcting section 23, the segmentation processing section 24 and then the compression processing section 3. The compression processing section 3 corresponds to the image compressing apparatus according to the present invention. The embodiment 2 configures the A/D converting section 20, the shading correcting section 21, the document type discriminating section 22 and the input tone correcting section 23, similarly to the embodiment 1. The segmentation processing section 24 outputs the RGB signal input by the input tone correcting section 23 toward the compression processing section 3.

The compression processing section 3 in embodiment 2 is configured, similarly to the compression processing section 3 in embodiment 1, accepts the image data of RGB signal input from the segmentation processing section 24, performs the image compressing method according to the present invention, similarly to the compression processing section 3 in embodiment 1, and thus generates the compression file obtained through compressing the input image data. The compression processing section 3 then outputs the generated compression file to the host apparatus (not shown). The host apparatus receives the compression file being output by the image processing apparatus 4, and performs further processing, such as the storage of the compression file, the external transmission of the compression file or the image output based on the compression file. The embodiment 2 may alternatively utilize a digital camera, instead of the color image input apparatus 11.

As described above, the embodiment 2 according to the present invention detects the text edge in the original image, generates the foreground layer and sets the foreground color which is different from the color of text, similarly to the embodiment 1. Therefore, it is possible to improve the visual recognition of the text on the reproduced image. Hence, the scanner apparatus in the embodiment 2 implements not only improving the visual recognition of the text on the reproduced image, but also reducing data size of the compression file.

Embodiment 3

Figure 21:
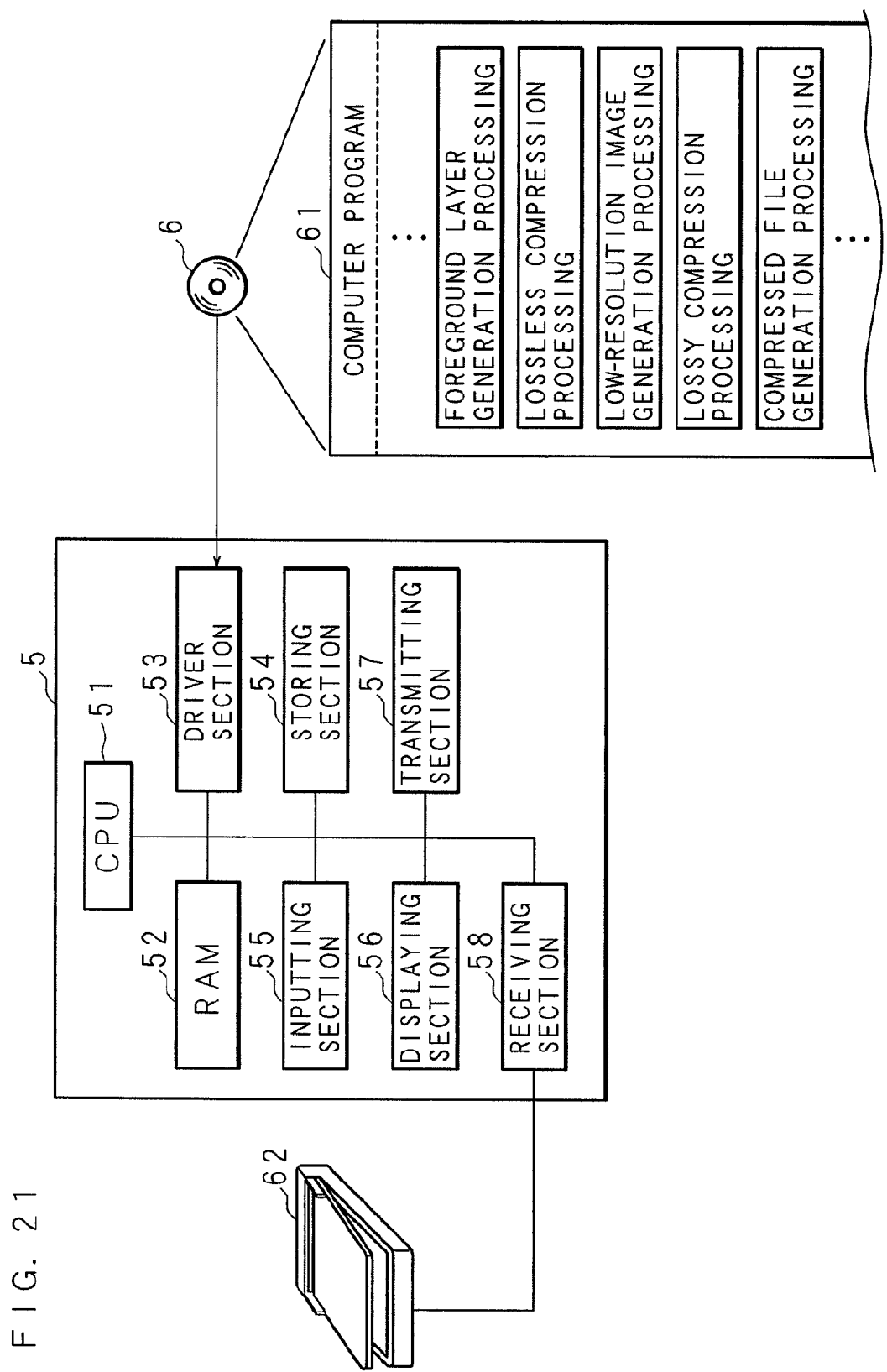
FIG. 21 is a block diagram showing an example of inner components included in the image compressing apparatus according to embodiment 3.

The image compressing apparatus according to the present invention is described in embodiment 3 to be a general-purpose computer. FIG. 21 is a block diagram showing an example of inner components included in the image compressing apparatus 5 according to embodiment 3. The image compressing apparatus 5 in the embodiment 3 is configured with the general-purpose computer, such as a PC or a server apparatus. The image compressing apparatus 5 includes: a CPU 51 that performs calculations; a RAM 52 that stores temporal information generated by the calculations; a driver section 53, such as a CD-ROM drive, that reads out information from a computer readable medium 6 according to the present invention, such as a optical disk; and a storing section 54, such as a hard disk. The CPU 51 makes the driver section 53 read out computer program 61 according to the present invention and makes the storing section 54 store the read computer program 61. The computer program 61 is loaded on the RAM 52 from the storing section 54, according to need, and then the CPU 51 performs required processing for the image compressing apparatus 5 based on the loaded computer program 61.

The image compressing apparatus 5 includes: an inputting section 55, such as a keyboard or a pointing device, that inputs information, such as an operation instruction, in response to user's manipulation; and a displaying section 56, such as a liquid crystal display, that displays several information. The image compressing apparatus 5 further includes: a transmitting section 57 that can be connected to external communication network (not shown); and a receiving section 58 connected to an external inputting apparatus 62 for inputting image data. The transmitting section 57 is, for example, a network card, a modem or the like. The inputting apparatus 62 is, for example, a flatbed scanner, a film scanner, a digital camera or the like. The inputting apparatus 62 optically reads out an image, generates image data, and transmits the generated image data to the image compressing apparatus 5. The receiving section 58 receives the transmitted image data from the inputting apparatus 62. The transmitting section 57 can externally transmit data through the communication network with utilizing communication method such as a facsimile or an e-mail.

The CPU 51 loads the computer program 61 according to the present invention onto the RAM 52, and performs the image compressing method according to the present invention based on the loaded computer program 61. Thus, when the receiving section 58 receives image data input from the inputting apparatus 62, the CPU 51 performs processing for generating the foreground layer, compressing with the lossless compression, obtaining the low-resolution image, compressing with the lossy compression and generating the compression file, similar to the processing in the embodiment 1 performed by the layer generating section 31, the lossless compressing section 32, the low-resolution image generating section 35, the lossy compressing section 34 and the compressed file generating section 33. Hence, the CPU 51 generates the compression file based on the received image data on which the compression processing is performed. The CPU 51 stores the generated compression file on the storing section 54. In accordance with the loaded computer program 61, the CPU 51 makes the transmitting section 57 externally transmit the generated compression file or the read compression file from the storing section 54.

As described above, the embodiment 3 according to the present invention detects the text edge in the original image, generates the foreground layer and sets the foreground color which is different from the color of text, similarly to the embodiment 1 and the embodiment 2. Therefore, the image compressing apparatus in the embodiment 3 can generate the compression file, with not only improving the visual recognition of the text on the reproduced image, but also reducing data size of the compression file.

As storing the computer program 61 according to the present invention, the computer readable medium 6 according to the present invention may be configured with a magnetic tape, a magnetic disk, a removable hard disk, an optical disk (e.g., CD-ROM, MO, MD, DVD or the like) or a card-type computer readable medium (e.g., IC card, memory card, optical card or the like). Alternatively, the computer readable medium 6 according to the present invention may be a semiconductor memory (e.g., a mask ROM, an Erasable Programmable Read Only Memory [EPROM], Electrically Erasable Programmable Read Only Memory [EEPROM], a flash ROM or the like), which can be mounted on the image compressing apparatus 5 and whose stored contents can be read out by the CPU 51.

Alternatively, the computer program 61 according to the present invention may be downloaded from an external server apparatus (not shown) to the image compressing apparatus 5 through the communication network, such as the Internet or LAN, and may be stored on the storing section 54. In this alternative embodiment, required program for downloading the computer program 61 may be previously stored on the storing section 54 or may be read out from a predetermined computer readable medium by the driver section 53, stored on the storing section 54 and loaded on the RAM 52 according to need.

In the embodiments 1 to 3, it is described about the processing for extracting the pixels corresponding to the text region on the foreground layer. However, the present invention is not limited to these descriptions. The present invention may utilize processing for extracting pixels corresponding to the line art region on the foreground layer. Furthermore, the present invention may utilize processing for extracting the pixels corresponding to the line art region, as well as the pixels corresponding to the text region.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image compressing apparatus, comprising:
   a receiving section that receives image data representing an image;
   a detecting section that detects an edge region of at least one of text and line art in the image represented by the image data which is received by the receiving section, wherein the edge region is a foreground layer;
   a binary image data generating section that generates a binary image data based on the image data received by the receiving section, in which a pixel value representing the foreground layer is different from a pixel value representing an other region;
   a foreground color information generating section that generates foreground color information of the foreground layer which represents a color different from a color of the at least one of text and line art;
   a lossless compressing section that performs lossless compression on the binary image data generated by the binary image data generating section;
   a lossy compressing section that performs lossy compression on the image data received by the receiving section; and
   a compressed file generating section that generates a compressed file containing the binary image data on which the lossless compression has been performed by the lossless compressing section, the image data on which the lossy compression has been performed by the lossy compressing section, and the color information generated by the foreground color information generating section.

2. An image compressing apparatus according to claim 1, further comprising:
   an extracting section that extracts a pixel representing at least one of text and line art in the image represented by the image data which is received by the receiving section; and
   an identifying section that identifies, among the pixels extracted by the extracting section, pixels around which 2, 4 or 8 nearest neighbor of at least one of text and line art pixels exist; and
   a subtracting section that subtracts the pixel identified by the identifying section from the pixel extracted by the extracting section, wherein
   the edge region detected by the detecting section is configured with the pixel extracted by the extracting section and remaining after the subtraction performed by the subtracting section.

3. An image compressing apparatus according to claim 1, wherein
   when the compression file generated by the compressed file generating section is decompressed, the image is reproduced to have the edge region illustrated with the color represented by the color information that is generated by the color image generating section.

4. An image compressing apparatus according to claim 1, wherein
   the color information generated by the foreground color information generating section represents an achromatic color.

5. An image compressing apparatus according to claim 1, further comprising:
   an overall color setting section that sets an overall color representative for whole of the image represented by the image data which is received by the receiving section;
   a vicinity color setting section that sets a vicinity color representative for vicinity of the edge region detected by the detecting section; and
   a selecting section that selects the overall color being set by the overall color setting section or the vicinity color being set by the vicinity color setting section, wherein
   the foreground color information generating section generates the color information representing the color selected by the selecting section.

6. An image compressing apparatus according to claim 1, further comprising:
   a low resolution processing section that performs a low resolution processing on the image data received by the receiving section, wherein
   the lossy compressing section performs the lossy compression on the image data on which the low resolution processing has been performed by the low resolution processing section.

7. An image compressing apparatus according to claim 1, further comprising:
   an outputting section that outputs the compression file generated by the compressed file generating section.

8. A method for compressing image data with an image input apparatus and an image compressing apparatus, comprising the steps of:
   inputting an image from the image input apparatus;
   generating image data based on the input image;

transmitting the generated image data to the image compressing apparatus;

detecting an edge region of at least one of text and line art in the image represented by the image data which is received by the image compressing apparatus, wherein the edge region is a foreground layer;

generating binary image data based on the image data received by the image compressing apparatus, in which a pixel value representing the foreground layer is different from a pixel value representing an other region;

generating foreground color information of the foreground layer which represents a color different from a color of at least one of text and line art;

performing lossless compression on the generated binary image data;

performing lossy compression on the image data received by the image compressing apparatus;

generating a compressed file that contains the binary image data on which the lossless compression has been performed, the image data on which the lossy compression has been performed and the generated color information.

9. A non-transitory computer readable medium having stored thereon computer executable program for processing data, wherein the computer program when executed causes a computer system to execute steps of:

receiving image data that represents an image;

detecting an edge region of at least one of a text and line art in the image represented by the received image data, wherein the edge region is a foreground layer;

generating binary image data based on the received image data, in which a pixel value representing the foreground layer is different from a pixel value representing the other region;

generating foreground color information of the foreground layer which represents a color different from a color of at least one of text and line art;

performing lossless compression on the generated binary image data;

performing lossy compression on the received image data;

generating a compressed file that contains the binary image data on which the lossless compression has been performed, the image data on which the lossy compression has been performed and the generated color information.

* * * * *